United States Patent
Kim et al.

(10) Patent No.: US 10,256,671 B2
(45) Date of Patent: Apr. 9, 2019

(54) SEMICONDUCTOR DEVICE FOR NEAR-FIELD COMMUNICATION

(71) Applicant: SAMSUNG ELECTRONICS CO., LTD., Suwon-si (KR)

(72) Inventors: Chan Yong Kim, Yongin-si (KR); In Hyuk Kim, Hanam-si (KR); Il Jong Song, Suwon-si (KR); Sang Hyo Lee, Incheon (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 205 days.

(21) Appl. No.: 15/356,863

(22) Filed: Nov. 21, 2016

(65) Prior Publication Data

US 2017/0170691 A1 Jun. 15, 2017

(30) Foreign Application Priority Data

Dec. 11, 2015 (KR) .................. 10-2015-0177128

(51) Int. Cl.
*H02J 50/80* (2016.01)
*H02J 50/20* (2016.01)
*H02J 50/40* (2016.01)
*H04B 5/00* (2006.01)

(52) U.S. Cl.
CPC ............ *H02J 50/20* (2016.02); *H02J 50/40* (2016.02); *H02J 50/80* (2016.02); *H04B 5/0037* (2013.01)

(58) Field of Classification Search
CPC .................................. H02J 50/40; H02J 50/80
See application file for complete search history.

(56) References Cited

U.S. PATENT DOCUMENTS

| | | | | |
|---|---|---|---|---|
| 6,003,777 A | * | 12/1999 | Kowalski | G06K 7/0008 235/439 |
| 7,936,095 B2 | | 5/2011 | Kawabata | |
| 8,432,293 B2 | | 4/2013 | Symons | |
| 8,497,658 B2 | | 7/2013 | Von Novak et al. | |
| 8,829,730 B2 | | 9/2014 | Urano | |
| 2008/0272889 A1 | * | 11/2008 | Symons | H02J 7/025 340/10.1 |
| 2009/0291635 A1 | * | 11/2009 | Savry | G06K 7/0008 455/41.1 |
| 2010/0190436 A1 | | 7/2010 | Cook et al. | |
| 2011/0127951 A1 | | 6/2011 | Walley et al. | |

(Continued)

FOREIGN PATENT DOCUMENTS

CN 103413165 A * 11/2013 ........... G06K 19/073

*Primary Examiner* — Thienvu Tran
*Assistant Examiner* — Pinping Sun
(74) *Attorney, Agent, or Firm* — Sughrue Mion, PLLC

(57) ABSTRACT

A semiconductor device is provided. The semiconductor device includes a first coil section that receives a first clock signal from a reader, a power generator that is electrically connected to the first coil section in accordance with a switching operation of a switch, a first near-field communication (NFC) chip that is electrically connected to the power generator and receives electric power in accordance with the first clock signal, a second NFC chip that generates a switching operation control signal for controlling the switching operation of the switch, and a second coil section that is electrically connected to the second NFC chip and receives a second clock signal from the reader.

20 Claims, 24 Drawing Sheets

(56) References Cited

U.S. PATENT DOCUMENTS

| | | | |
|---|---|---|---|
| 2011/0210620 A1* | 9/2011 | Shinoda | H02J 5/005 307/104 |
| 2011/0215768 A1* | 9/2011 | Osada | H01M 10/0436 320/137 |
| 2011/0266880 A1 | 11/2011 | Kim et al. | |
| 2012/0153894 A1* | 6/2012 | Widmer | H04B 5/0037 320/108 |
| 2013/0084800 A1 | 4/2013 | Troberg et al. | |
| 2013/0234658 A1* | 9/2013 | Endo | H02J 5/005 320/108 |
| 2013/0290747 A1 | 10/2013 | Miwa et al. | |
| 2014/0045425 A1 | 2/2014 | Roh et al. | |
| 2014/0327390 A1* | 11/2014 | Park | H02J 7/025 320/108 |
| 2015/0035480 A1 | 2/2015 | Shichino | |
| 2015/0180240 A1* | 6/2015 | Kwon | H02J 5/005 307/104 |
| 2015/0305595 A1* | 10/2015 | Khait | A61B 1/00036 307/104 |

* cited by examiner

1200

1300

1400

US 10,256,671 B2

SEMICONDUCTOR DEVICE FOR NEAR-FIELD COMMUNICATION

This application claims priority from Korean Patent Application No. 10-2015-0177128 filed on Dec. 11, 2015 in the Korean Intellectual Property Office, the disclosure of which is incorporated herein by reference in its entirety.

BACKGROUND

1. Technical Field

The present disclosure relates to a semiconductor device for near-field communication.

2. Description of the Related Art

A near-field communication (NFC) card, also referred to as a smart card, a chip card, an integrated circuit (IC) card, may operate in either a passive mode and or an active mode depending on the appropriate operation method.

An NFC card may receive a signal sent from a reader in the passive mode, whereas the NFC card may load transmission data on the signal sent from the reader and send the modified signal back to the reader in the active mode.

SUMMARY

Example embodiments provide a semiconductor device including a configuration which reduces the regular consumption power by dividing the passive mode and the active mode through the switching operation and does not affect other NFC communications.

According to an aspect of an example embodiment, there is provided a semiconductor device including a first coil section configured to receive a first clock signal from a reader, a power generator that is electrically connected to the first coil section in accordance with a switching operation of a switch, a first NFC chip that is electrically connected to the power generator and configured to receive electric power in accordance with the first clock signal, a second NFC chip configured to generate a switching operation control signal for controlling the switching operation of the switch, and a second coil section that is electrically connected to the second NFC chip and configured to receive a second clock signal from the reader.

According to an aspect of another example embodiment, there is provided a semiconductor device including a first coil section configured to receive a first clock signal from a reader, a power generator that is electrically connected to the first coil section in accordance with a switching operation of a switch, a load chip that is electrically connected to the power generator and configured to receive electric power in accordance with the first clock signal, wherein the load chip includes application software, an NFC chip configured to generate a switching operation control signal for controlling the switching operation of the switch, and is electrically connected to the load chip to transmit and receive data, and a second coil section that is electrically connected to the second NFC chip and configured to receive a second clock signal from the reader.

According to an aspect of another example embodiment, there is provided a semiconductor device including a first coil section configured to receive a first clock signal from a reader, a power generator including a matching circuit electrically connected to the first coil section in accordance with a switching operation of a switch to perform impedance matching, and a first NFC chip configured to receive a voltage signal from the matching circuit to generate electric power, a load chip that is electrically connected to the first NFC chip and configured to receive the electric power in accordance with the first clock signal, wherein the load chip comprises application software, a second NFC chip configured to generate a switching operation control signal for controlling the switching operation of the switch, and a second coil section that is electrically connected to the second NFC chip and configured to receive a second clock signal from the reader.

According to an aspect of another example embodiment, there is provided a semiconductor device including a coil section configured to receive a clock signal from a reader, a power generator that is electrically connected to the coil section to generate electric power in accordance with the clock signal, a load chip that is electrically connected to the power generator and configured to receive the electric power from the power generator in accordance with the clock signal, wherein the load chip may include application software, and an NFC chip that is electrically connected to the power generator and the load chip, wherein the NFC chip is configured to receive the electric power from the power generator in accordance with the clock signal or exchange data with the load chip, and wherein the NFC chip is configured to perform authentication in accordance with the clock signal.

According to an aspect of an example embodiment, there is provided a semiconductor device including a coil section configured to receive a clock signal from a reader; a power generator including a matching circuit electrically connected to the coil section to perform impedance matching, and an NFC chip configured to receive a voltage signal from the matching circuit to generate electric power; and a load chip that is electrically connected to the NFC chip and configured to receive the electric power in accordance with the clock signal, wherein the load chip includes application software, wherein the NFC chip is configured to perform authentication in accordance with the clock signal.

BRIEF DESCRIPTION OF THE DRAWINGS

The above and other aspects and features will become more apparent by describing in detail example embodiments with reference to the attached drawings, in which.

DETAILED DESCRIPTION OF EXAMPLE EMBODIMENTS

Example embodiments will now be described more fully with reference to the accompanying drawings.

Figure 1:
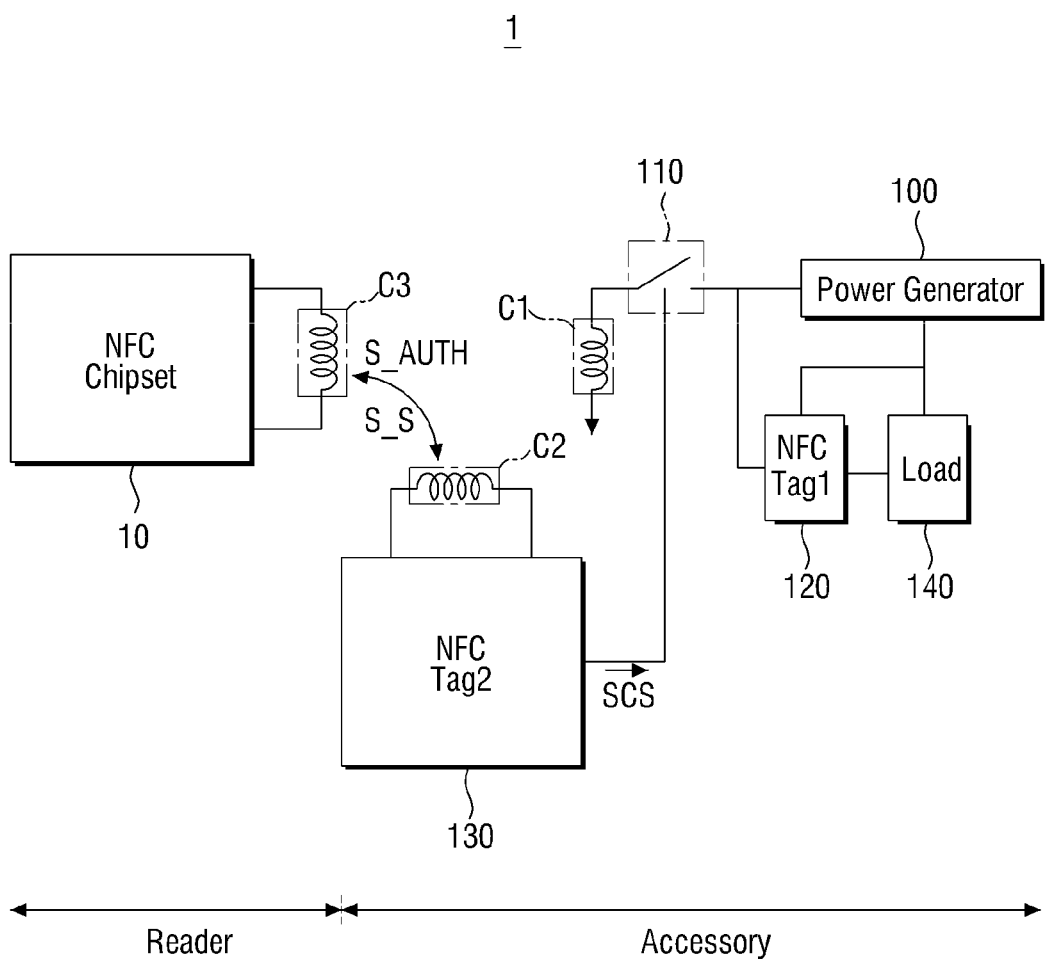
FIG. 1 is a block diagram of a semiconductor device according to an example embodiment.

FIG. 1 is a block diagram illustrating a semiconductor device according to an example embodiment. As shown in FIG. 1, a semiconductor device 1 may include a reader and an accessory that communicates with the reader. The accessory may include a first coil section C1, a power generator 100, a switch 110, a first NFC chip (also referred to as "NFC tag") 120, a second NFC chip 130, a load chip 140, and a second coil section C2.

The accessory may operate in conjunction with a reader, and the reader may include an NFC chipset 10 and a third coil section C3 electrically connected to the NFC chipset 10. The NFC chipset 10 may send a signal through the third coil section C3.

The first coil section C1 may receive the signal (i.e., a first clock signal) sent from the reader. In some embodiments, although the signal sent from the reader may, for example, be provided in the form of near-field communication (NFC), the present disclosure is not limited thereto. Here, the first clock signal (i.e., timing signal) may include a voltage signal or data.

The power generator 100 may be electrically connected to the first coil section C1, depending on the switching operation of the switch 110. The power generator 100 may receive the first clock signal sent from the reader through the first coil section C1 to generate electric power P and provide the power to the first NFC chip 120 and/or the load chip 140. The first NFC chip 120 and the load chip 140 may be electrically connected to the power generator 100. The load chip 140 may include an application, and the application may include various types of software, depending on the user's needs.

Figure 2:
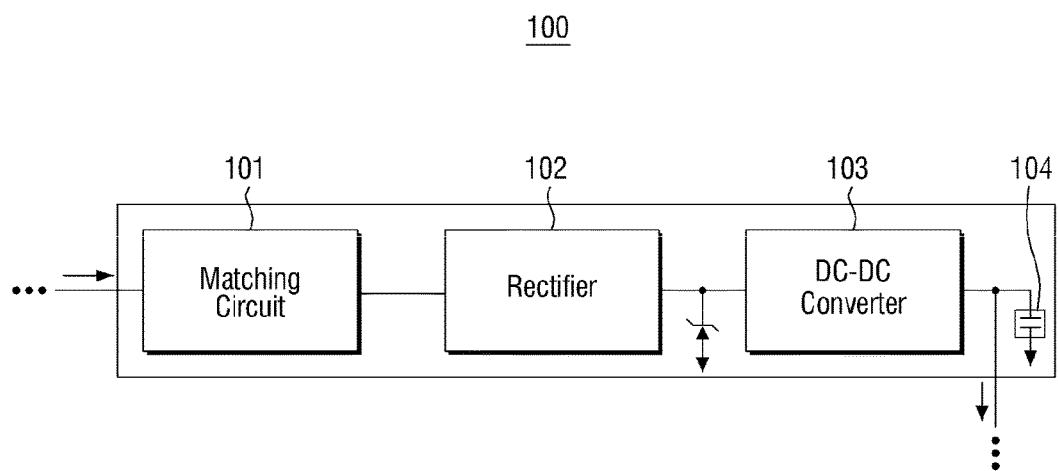
FIG. 2 is a block diagram illustrating a power generator of FIG. 1 according to an example embodiment.

FIG. 2 is a block diagram illustrating a power generator of FIG. 1 according to an example embodiment. However, the power generator of FIG. 2 may be used in conjunction with other embodiments described in this disclosure. The power generator 100 may include a matching circuit 101, a rectifier 102, a converter 103 and a capacitor 104. The matching circuit 101 may perform the impedance matching between a transmission end (i.e., the reader) and a reception end (i.e., the first coil section C1). The rectifier 102 may rectify an alternating current (AC) voltage received through the first coil section C1 to generate a direct current (DC) voltage. The converter 103, for example, may be a DC-to-DC converter and may adjust a voltage level of the DC voltage output from the rectifier 102 to conform to the load capacity of the first NFC chip 120 or the load chip 140. The capacitor 104 may store reserve power that is provided to the first NFC chip 120 or the load chip 140, when the switch 110 is switched off.

Figure 3:
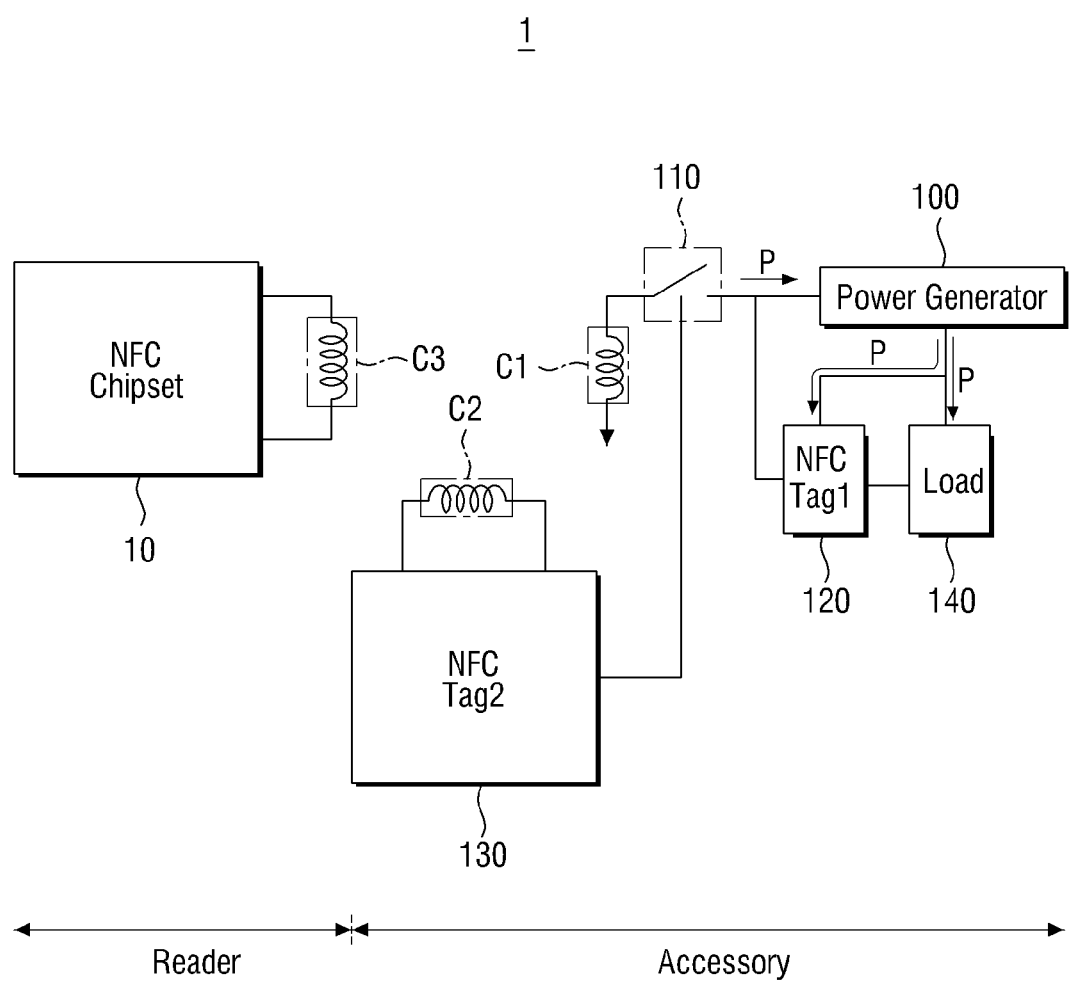
FIGS. 3 and 4 are block diagrams illustrating operations of the semiconductor device of FIG. 1.
Figure 4:
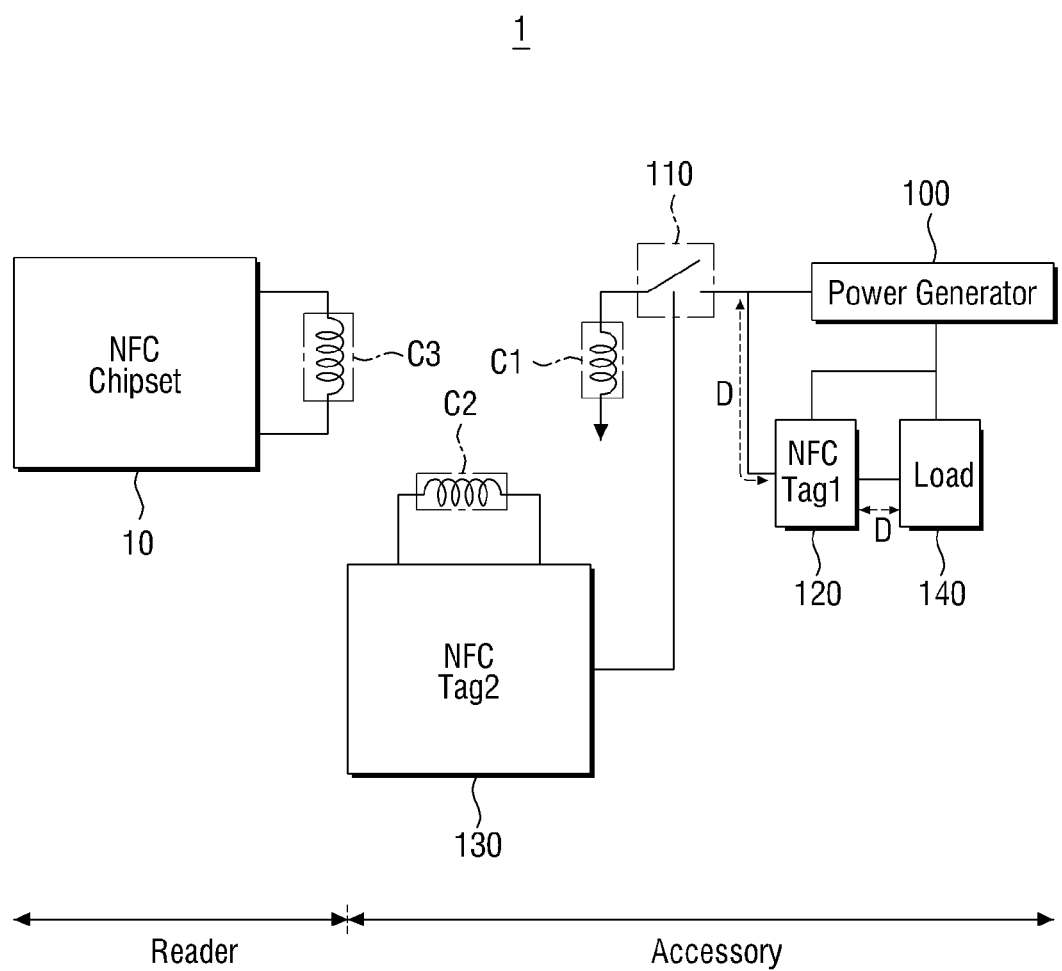

FIGS. 3 and 4 are block diagrams illustrating operations of the semiconductor device of FIG. 1. As shown in FIG. 3, the first NFC chip 120 is electrically connected to the power generator 100, and may receive electric power from the power generator 100 in accordance with a first clock signal. The second NFC chip 130 may receive a second clock signal from the reader to generate a switching operation control signal (SCS) that controls the switching operation of the switch 110. The second coil section C2 is electrically connected to the second NFC chip 130, and the second NFC chip 130 may receive the second clock signal through the second coil section C2.

When the first clock signal includes a voltage signal, the first NFC chip 120 may receive electric power from the power generator 100. Specifically, on the basis of the voltage signal and a switching operation signal (S_S) sent from the reader, the second NFC chip 130 may generate a switching operation control signal (SCS) to the switch 110. The first coil section C1 may then receive the voltage signal and relay the voltage signal to the power generator 100 such that the first NFC chip 120 can receive the electric power P generated by the power generator 100. Further, the electric power P generated by the power generator 100 may also be provided to the load chip 140.

When the second clock signal includes a switching operation signal of the switch 110, the second NFC chip 130 may generate a switching operation control signal (SCS) and provide the switching operation control signal (SCS) to switch on the switch 110. Further, the switch 110 may also be switched off by the switching operation control signal (SCS).

When the second clock signal sent from the reader includes a switch-on signal, the second NFC chip 130 may generate a switching operation control signal (SCS) that instructs the switch-on operation of the switch 110. When the second clock signal sent from the reader includes a switch-off signal, the second NFC chip 130 may generate a switching operation control signal (SCS) that instructs the switch-off operation of the switch 110.

When the switch 110 is switched on, the first coil section C1 and the power generator 100 may be electrically connected to each other, and the first clock signal sent from the reader may be provided to the power generator 100.

According to the semiconductor device 1, by default (i.e., in an idle state), the switch 110 may be switched off, and the power generator 100 may not perform the power generation operation. Thus, the reader may not consume battery power in this state. The second clock signal including the switching operation signal (i.e., a signal for switching on the switch 110) from the reader needs to be provided to the second coil section C2 such that the second NFC chip 130 may generate the switching operation control signal (SCS). The switch 110 may be switched on based on the switching operation control signal (SCS) generated from the second NFC chip 130, and the first coil section C1 and the power generator 100 may be electrically connected to each other depending on the switch-on operation of the switch 110.

When the first coil section C1 and the power generator 100 are electrically connected to each other, the voltage signal sent from the reader may be provided to the power generator 100 through the first coil section C1, and the power generator 100 may generate the electric power P and provide the power to the first NFC chip 120 or the load chip 140.

In FIG. 4, the data transmission and reception process of the semiconductor device 1 is illustrated.

The first NFC chip 120 and the load chip 140 may be electrically connected to each other, and data may be transmitted and received through wired communication between the first NFC chip 120 and the load chip 140. However, the disclosure is not limited thereto, and the data may be transmitted and received wirelessly between the first NFC chip 120 and the load chip 140, if necessary.

When the switch 110 is switched on, the first coil section C1 and the first NFC chip 120 may be electrically connected to each other. When the switch 110 is in an ON state, the data (i.e., the received data) sent from the reader may be transmitted to the first NFC chip 120 through the first coil section C1, and the first NFC chip 120 may transmit the received data to the load chip 140. Also, the transmission data generated from the load chip 140 may be transmitted to the first NFC chip 120, and the first NFC chip 120 may output the transmission data to the reader to perform the data transmission and reception operations.

Further, the second NFC chip 130 may perform an authentication operation. Specifically, when the second clock signal sent from the reader includes an authentication signal S_AUTH, the second NFC chip 130 may receive the authentication signal S_AUTH through the second coil section C2, and the second NFC chip 130 may authentication by determining whether the reader and/or the accessory is a genuine (i.e., authorized) device. By selectively authorizing the power and data transfer only when the authentication process is successful through the second NFC chip 130, it is possible to prevent the use of counterfeit or unauthorized devices.

Consequentially, the first clock signal may include a voltage signal or data, and the second clock signal may include an authentication signal S_AUTH or the switching operation signal. Further, in order that the voltage signal or data included in the first clock signal may be sent from the reader, the second NFC chip 130 may need to perform the authentication operation in accordance with the authentication signal S_AUTH included in the second clock signal, and the second NFC chip 130 may need to generate the switching operation signal (SCS) to switch on the switch 110 based on the switching operation signal included in the second clock signal.

Figure 5:
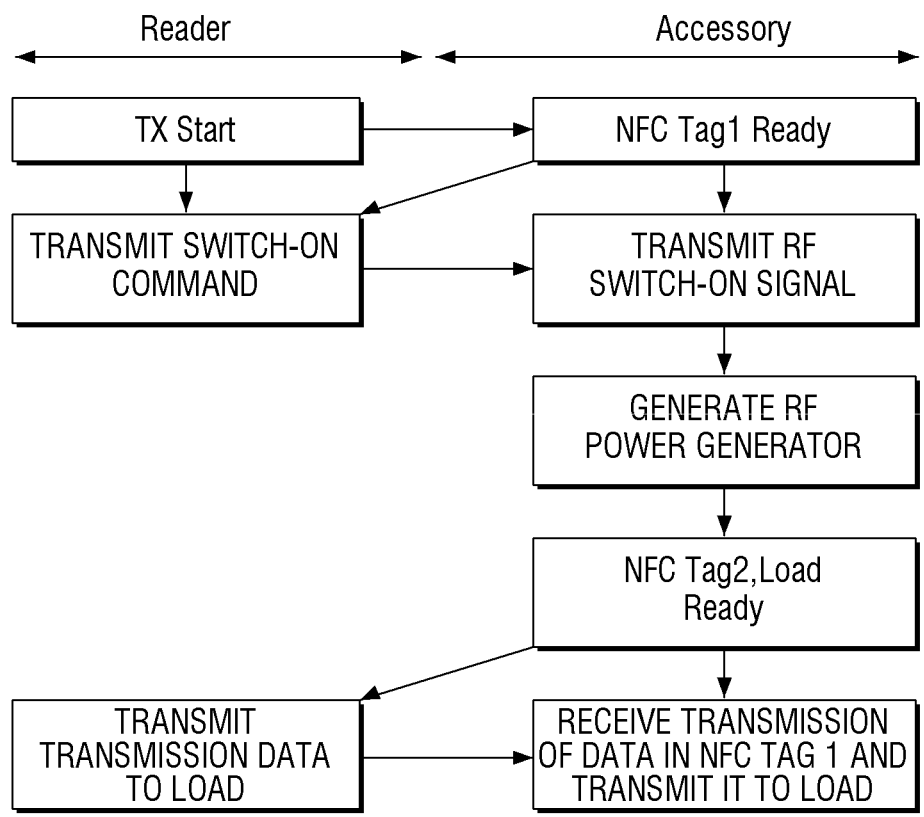
FIG. 5 is a sequence diagram illustrating operation of the semiconductor device of FIG. 1.

FIG. 5 is a sequence diagram illustrating operation of the exemplary semiconductor device 1. However, the sequence diagram of FIG. 5 may apply to other embodiments described in this disclosure.

With regards to the reader and the accessory included in the semiconductor device 1, the reader may send a switching operation signal to the second NFC chip 130, and the second NFC chip 130 may generate a switching operation control signal (SCS). The second NFC chip 130 provides the switching operation control signal (SCS) to the switch 110 to switch on the switch 110, and provide the voltage signal to the power generator 100 through the first coil section C1 to perform the power generation operation in the power generator 100. The electric power P generated by the power generator 100 may be provided to the first NFC chip 120 and the load chip 140. Subsequently, the reader may send the transmission data to be transmitted to the load chip 140, and the first NFC chip 120 receives the transmission data and transmits the data to the load chip 140 to perform the data transmission and reception operation.

Figure 6:
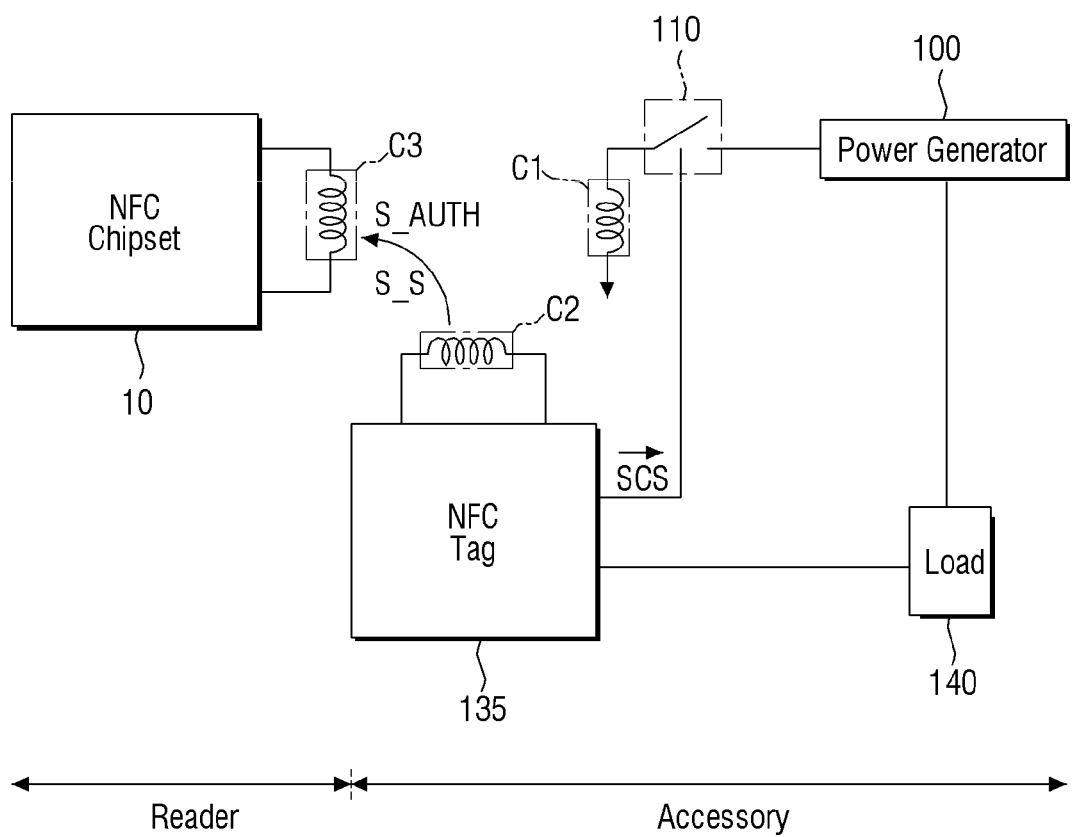
FIG. 6 is a block diagram of a semiconductor device according to an example embodiment.
Figure 7:
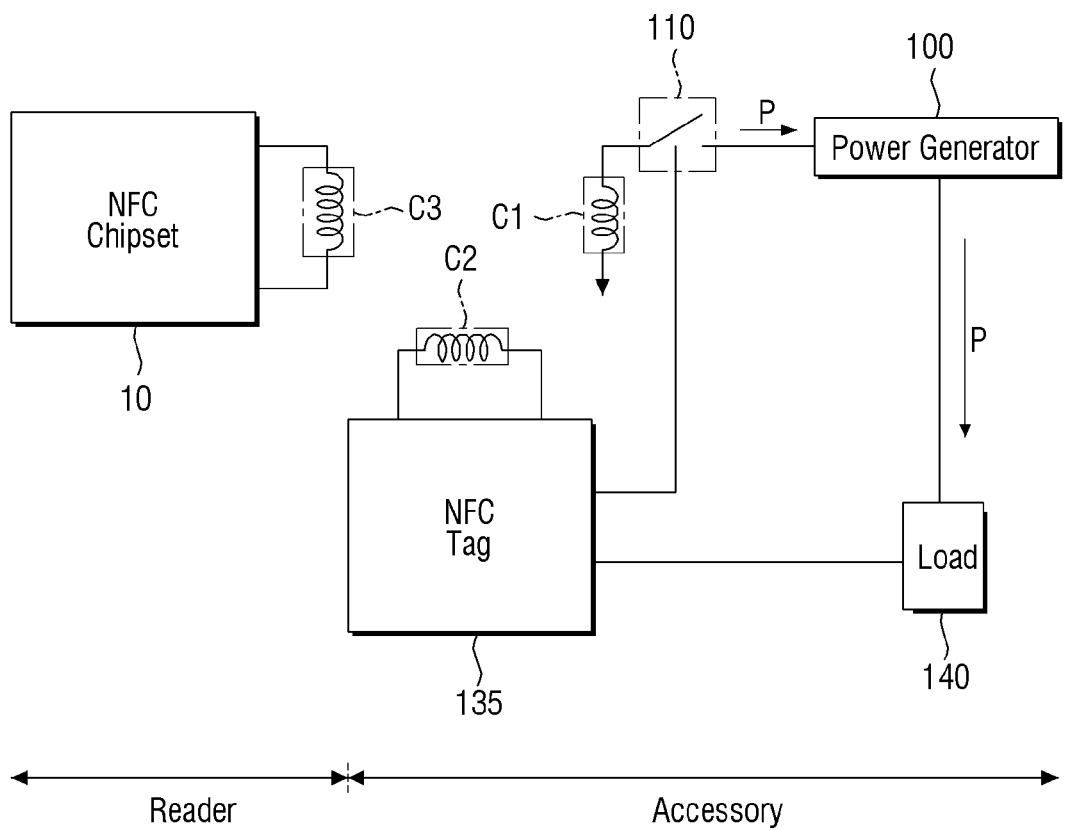
FIGS. 7 and 8 are block diagrams illustrating operations of the semiconductor device of FIG. 6.
Figure 8:
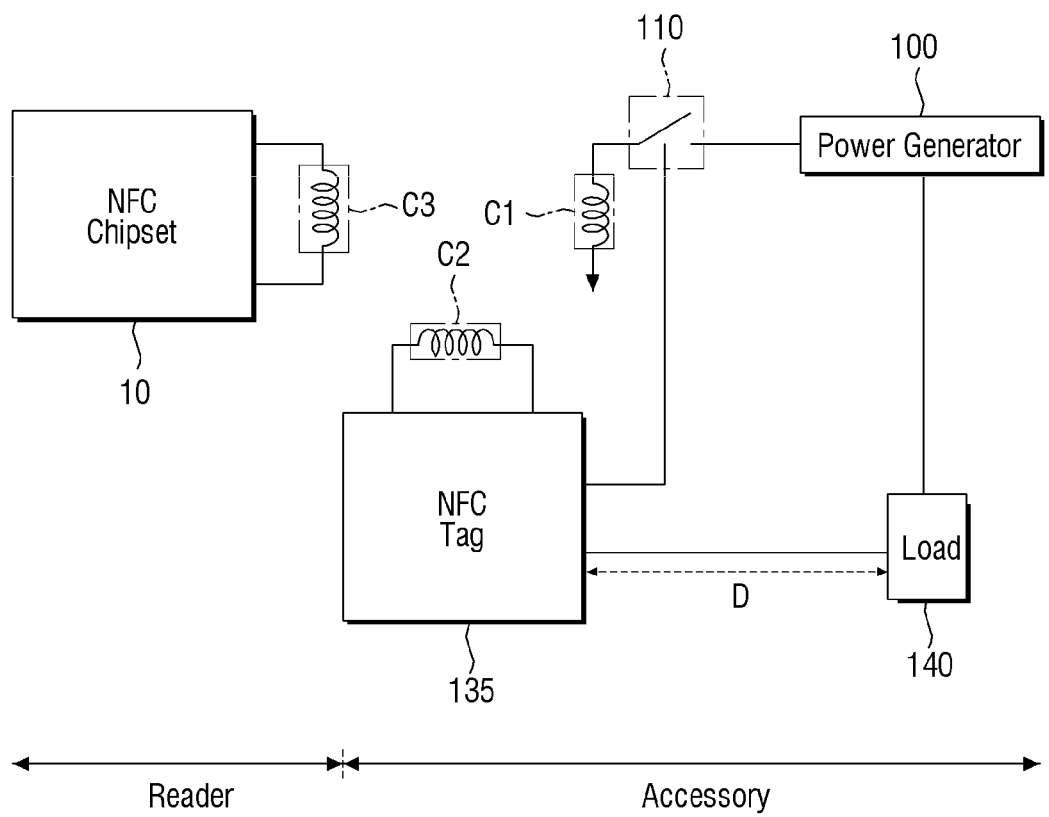

FIG. 6 is a block diagram illustrating a semiconductor device according to an example embodiment. FIGS. 7 and 8 are block diagrams illustrating operations of the semiconductor device of FIG. 6. Hereinafter, the description of the repeated parts of the above-described embodiment will be omitted, and differences will be mainly described.

As shown in FIG. 6, a semiconductor device 2 may include a reader and an accessory. The accessory portion of the semiconductor device 2 may include a first coil section C1, a power generator 100, a switch 110, an NFC chip 135, a load chip 140, and a second coil section C2.

The accessory portion of the semiconductor device 2 may operate in conjunction with the reader, and the reader may include an NFC chipset 10 and a third coil section C3 electrically connected to the NFC chipset 10. The reader may send a signal through the third coil section C3.

The first coil section C1 may receive the signal (i.e., a first clock signal) sent from the reader. Here, the first clock signal may include a voltage signal.

The power generator 100 may be electrically connected to the first coil section C1, depending on the switching operation of the switch 110. The power generator 100 may receive the first clock signal sent from the reader through the first coil section C1 to generate an electric power P to be provided to the load chip 140. The load chip 140 may be electrically connected to the power generator 100. The load chip 140 may include an application, and the application may include various types of software, depending on the user's needs.

The NFC chip 135 may receive a second clock signal from the reader to generate a switching operation control signal (SCS) for controlling the switching operation of the switch 110. The second coil section C2 is electrically connected to the NFC chip 135, and the NFC chip 135 may receive the second clock signal through the second coil section C2.

When the first clock signal includes a voltage signal, the load chip 140 may receive electric power from the power generator 100. Specifically, the NFC chip 135 may generate the switching operation control signal (SCS) depending on the voltage signal and the switching operation signal S_S sent from the reader to switch on the switch 110, and the first coil section C1 may receive a voltage signal and provide it to the power generator 100 such that the load chip 140 can receive the electric power P generated by the power generator 100.

When the second clock signal includes a switching operation signal of the switch 110, the NFC chip 135 may generate the switching operation control signal (SCS) and provide the signal to the switch 110 to switch on the switch 110. In addition, the switch 110 may also be switched off by the switching operation control signal (SCS).

When the second clock signal sent from the reader includes the switch-on signal, the NFC chip 135 may generate the switching operation control signal (SCS) that instructs the switch 110 to switch on, and when the second clock signal sent from the reader includes a switch-off signal, the NFC chip 135 may generate the switching operation control signal (SCS) that instructs the switch 110 to switch off.

As shown in FIG. 7, when the switch 110 is switched on, the first coil section C1 and the power generator 100 may be electrically connected to each other, the switch 110 may be switched on, and the first clock signal sent from the reader may be provided to the power generator 100.

According to the semiconductor device 2, by default (i.e., in an idle state), the switch 110 may be in the OFF state, and the power generator 100 may not perform the power generation operation. Thus, the reader may consume battery power in this state. The second clock signal including the switching operation signal (i.e., a signal for switching on the switch 110) from the reader needs to be provided to the second coil section C2 such that the NFC chip 135 may generate the switching operation control signal (SCS). The switch 110 may be switched on based on the switching operation control signal (SCS) generated from the NFC chip 135, and the first coil section C1 and the power generator 100 may be electrically connected to each other depending on the switch-on operation of the switch 110.

When the first coil section C1 and the power generator 100 are electrically connected to each other, the voltage signal sent from the reader may be provided to the power generator 100 through the first coil section C1, and the power generator 100 may generate the electric power P and provide the power to the load chip 140.

As shown in FIG. 8, the NFC chip 135 and the load chip 140 may be electrically connected to each other, and data may be transmitted and received through a wired communication channel between the NFC chip 135 and the load chip 140. However, the present disclosure is not limited thereto, and the data may be transmitted and received between the NFC chip 135 and the load chip 140 wirelessly, if necessary.

The data (i.e., reception data or inbound data) sent from the reader may be transmitted to the NFC chip 135 through the second coil section C2, and the NFC chip 135 may transmit the reception data to the load chip 140. Also, the transmission data (i.e., outbound data) generated from the load chip 140 may be transmitted to the NFC chip 135, and the NFC chip 135 may output the transmission data to the reader as part of the data transmission and reception operations.

Further, the NFC chip 135 may perform an authentication operation. Specifically, when the second clock signal sent from the reader includes an authentication signal S_AUTH, the NFC chip 135 may receive the authentication signal S_AUTH through the second coil section C2, and the NFC chip 135 may perform authentication by determining whether the reader and/or the accessory is a genuine and/or authorized device. By selectively authorizing the power and data transfer only when the authentication process is successful through the NFC chip 135, it is possible to prevent the use of counterfeit or unauthorized devices.

Consequentially, the first clock signal may include a voltage signal, and the second clock signal may include an authentication signal S_AUTH, a switching operation signal, or data. Further, in order that the voltage signal or data included in the first clock signal may be sent from the reader, the NFC chip 135 may need to perform the authentication operation in accordance with the authentication signal S_AUTH included in the second clock signal, and the NFC chip 135 may need to generate the switching operation signal (SCS) for performing the switch-on operation of the switch 110 depending on the switching operation signal included in the second clock signal.

Figure 9:
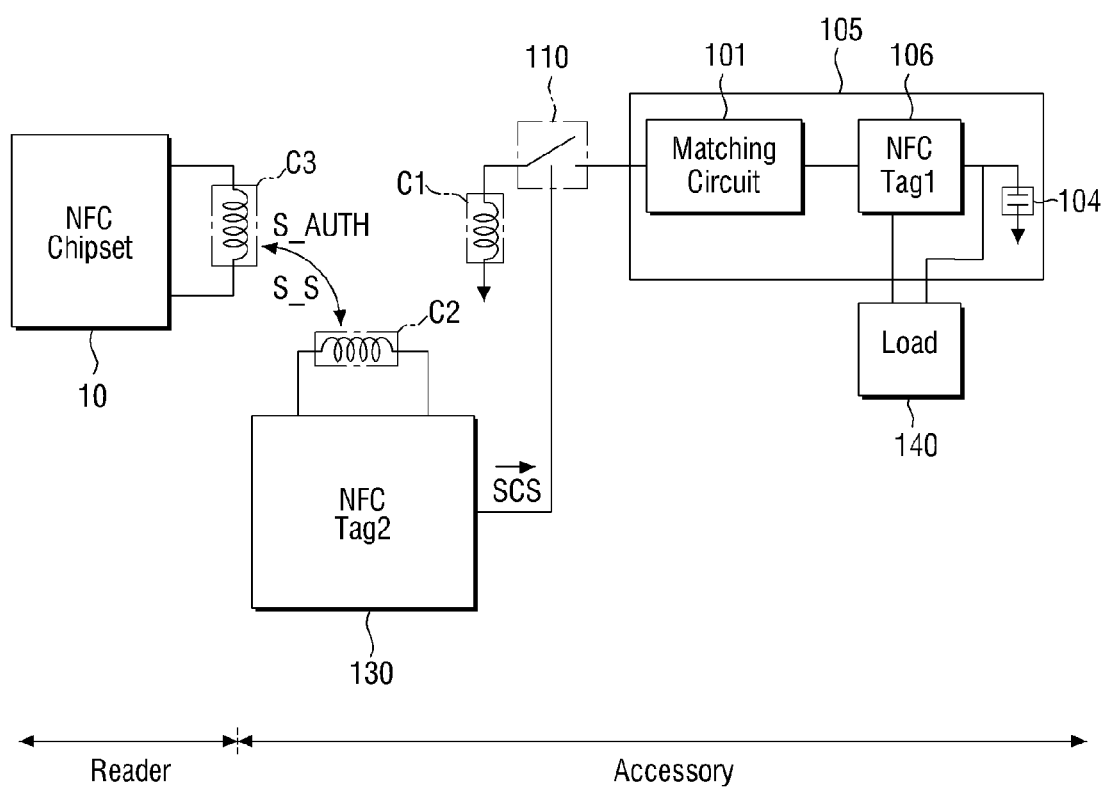
FIG. 9 is a block diagram of a semiconductor device according to an example embodiment.
Figure 10:
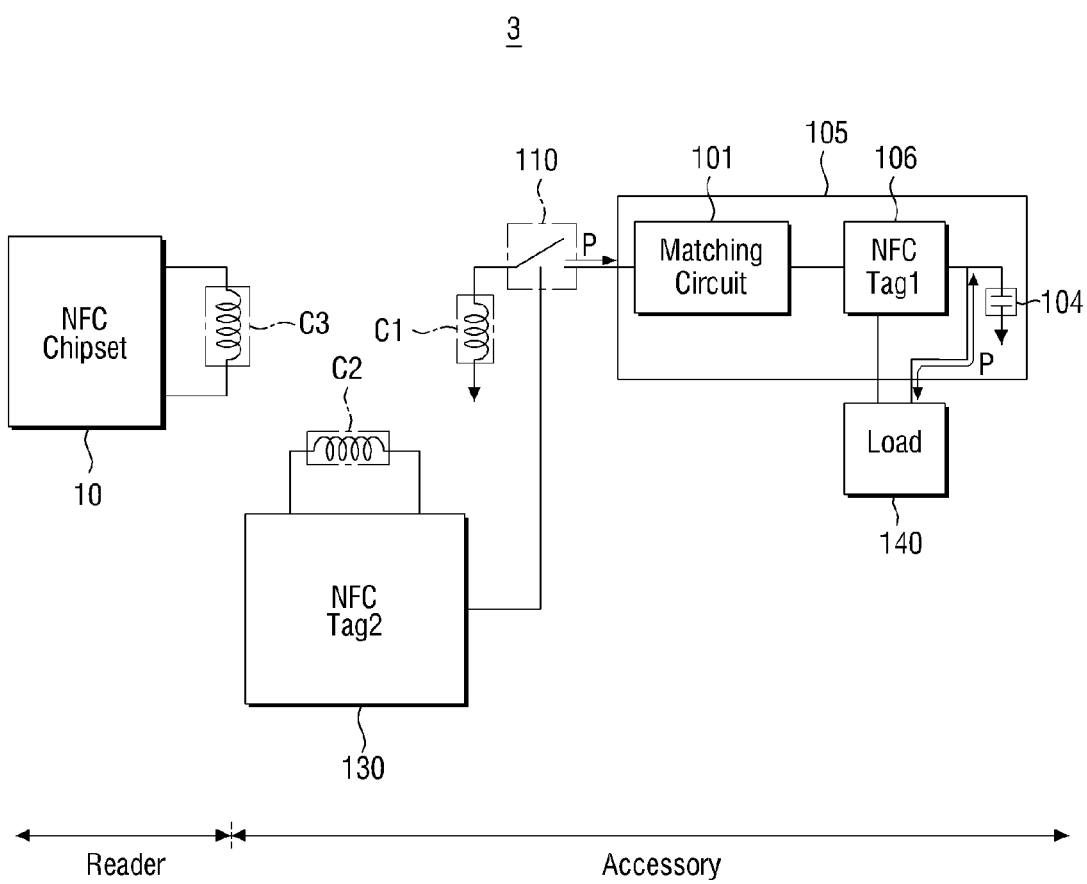
FIGS. 10 and 11 are block diagrams illustrating operations of the semiconductor device of FIG. 9.
Figure 11:
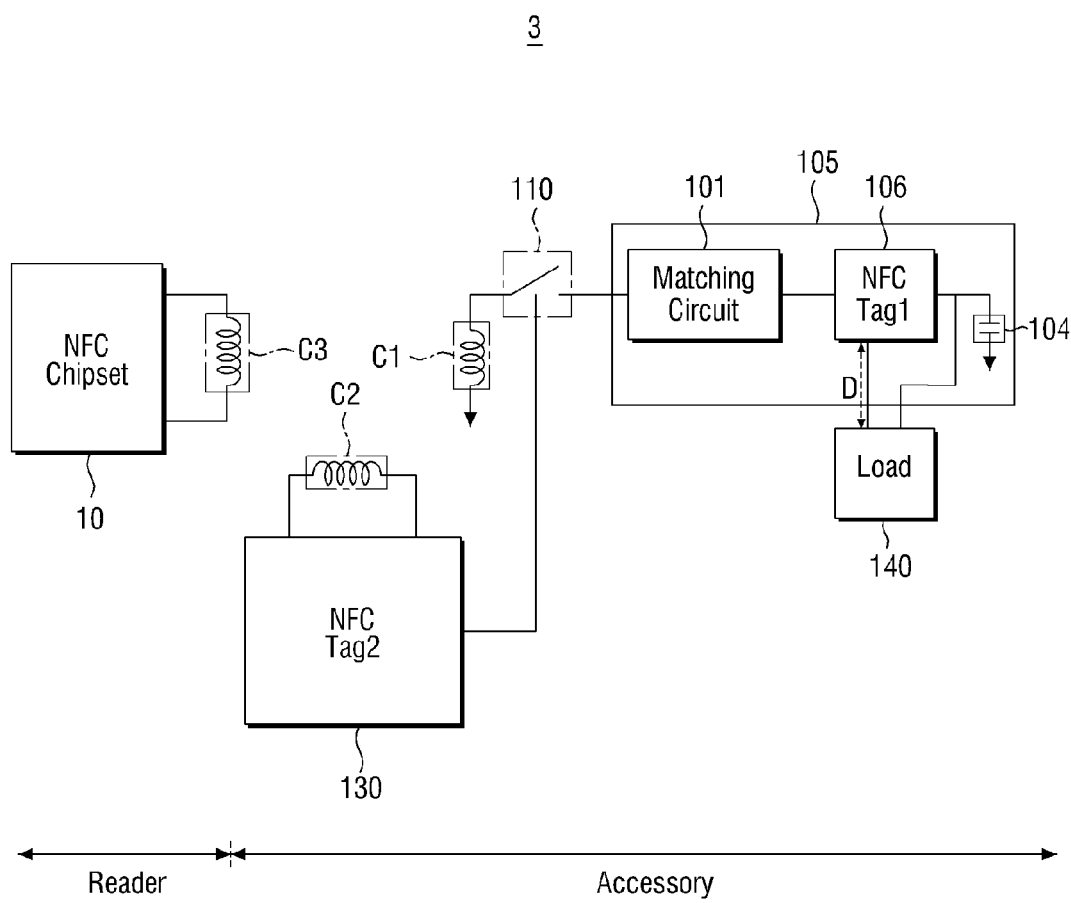

FIG. 9 is a block diagrams illustrating a semiconductor device according to an example embodiment. FIGS. 10 and 11 are block diagrams illustrating operations of the semiconductor device of FIG. 9. Hereinafter, the description of the repeated parts of the above-described embodiment will be omitted, and differences will be mainly described.

As shown in FIG. 9, a semiconductor device 3 may include at least a reader and an accessory. The accessory portion of the semiconductor device 3 may include a first coil section C1, a power generator 105, a switch 110, a first NFC chip 106, a second NFC chip 130, a load chip 140, and a second coil section C2.

The accessory portion of the semiconductor device 3 may operate in conjunction with the reader, and the reader may include an NFC chipset 10 and a third coil section C3 electrically connected to the NFC chipset 10. The reader may send a signal through the third coil section C3.

The first coil section C1 may receive the signal (i.e., a first clock signal) sent from the reader. Here, the first clock signal may include a voltage signal or data.

The power generator 105 may be electrically connected to the first coil section C1, depending on the switching operation of the switch 110. The power generator 105 may receive the first clock signal sent from the reader through the first coil section C1 to generate an electric power P to be provided to the load chip 140. The load chip 140 may be electrically connected to the power generator 105. The load chip 140 may include an application, and the application may include various types of software, depending on the user's needs.

The power generator 105 may include a matching circuit 101, a first NFC chip 106, and a capacitor 104. The matching circuit 101 may perform impedance matching between a transmission end (i.e., the reader) and a reception end (i.e., the first coil section C1). The first NFC chip 106 may receive a voltage signal from the matching circuit 101 to generate electric power P that is supplied to the load chip 140. The capacitor 104 may store a reserve power that may be provided to the load chip 140, when the switch 110 is switched off.

The load chip 140 may be electrically connected to the power generator 105 and receive the electric power provided by the power generator 105 depending on the first clock signal. The second NFC chip 130 may receive a second clock signal from the reader to generate a switching operation control signal (SCS) for controlling the switching operation of the switch 110. The second coil section C2 may be electrically connected to the second NFC chip 130, and the second NFC chip 130 may receive the second clock signal through the second coil section C2.

When the first clock signal includes a voltage signal, the load chip 140 may receive the electric power from the power generator 105. Specifically, the second NFC chip 130 may generate the switching operation control signal (SCS) based on the voltage signal and the switching operation signal S_S sent from the reader to switch on the switch 110. The first coil section C1 may receive a voltage signal and provide it to the power generator 105 such that the load chip 140 can receive the electric power P generated by the power generator 105.

When the second clock signal includes a switching operation signal of the switch 110, the second NFC chip 130 may generate the switching operation control signal (SCS) and may provide the signal to the switch 110 in order to switch on the switch 110. In addition, the switch 110 may also be switched off by the switching operation control signal (SCS).

When the second clock signal sent from the reader includes the switch-on signal, the second NFC chip 130 may generate the switching operation control signal (SCS) that instructs the switch 110 to switch on, and when the second clock signal sent from the reader includes a switch-off signal, the second NFC chip 130 may generate the switching operation control signal (SCS) that instructs the switch 110 to switch off.

When the switch 110 is switched on, the first coil section C1 and the power generator 105 may be electrically connected to each other, and the first clock signal sent from the reader may be provided to the power generator 105.

According to the semiconductor device 3, by default (i.e., in an idle state), the switch 110 may normally be in an OFF state, and the power generator 105 may not perform the power generation operation. Thus, the reader may not need to consume batter power in this state. The second clock signal including the switching operation signal (i.e., a signal for switching on the switch 110) from the reader may need to be provided to the second coil section C2 such that the second NFC chip 130 may generate the switching operation control signal (SCS). The switch 110 may be switched on based on the switching operation control signal (SCS) generated from the second NFC chip 130, and the first coil section C1 and the power generator 105 may be electrically connected to each other depending on the switch-on operation of the switching section 110.

As shown in FIG. 10, when the first coil section C1 and the power generator 105 are electrically connected to each other, the voltage signal sent from the reader may be provided to the power generator 105 through the first coil section C1, and the power generator 105 may generate the electric power P and provide the power to the load chip 140.

The data transmission and reception process of the semiconductor device 3 is illustrated in FIG. 11.

The first NFC chip 106 and the load chip 140 may be electrically connected to each other, and data may be transmitted and received between the first NFC chip 106 and the load chip 140 via a wired communication channel. However, the present disclosure is not limited thereto, and the data may be wirelessly transmitted and received between the first NFC chip 106 and the load chip 140, if necessary.

When the switch 110 is switched on, the first coil section C1 and the first NFC chip 106 may be electrically connected to each other. In the ON state of the switching section 110, the data (i.e., the reception data or inbound data) sent from the reader may be transmitted to the first NFC chip 106 through the first coil section C1, and the first NFC chip 106 may transmit the reception data to the load chip 140. Also, the transmission data (i.e., outbound data) generated from the load chip 140 may be transmitted to the first NFC chip 106, and the first NFC chip 106 may output the transmission data to the reader as part of the data transmission and reception operations.

Further, the second NFC chip 130 may perform an authentication operation. Specifically, when the second clock signal sent from the reader includes an authentication signal S_AUTH, the second NFC chip 130 may receive the authentication signal S_AUTH through the second coil section C2, and the second NFC chip 130 may perform authentication by determining whether the reader and/or the accessory is a genuine and/or authorized device. By selectively authorizing the power and data transfer only when the authentication process is successful through the second NFC chip 130, it is possible to prevent the use of counterfeit or unauthorized devices.

Consequentially, the first clock signal may include a voltage signal or data, and the second clock signal may include an authentication signal S_AUTH or a switching operation signal. Further, in order that the voltage signal or data included in the first clock signal may be sent from the reader, the second NFC chip 130 may need to perform the authentication operation in accordance with the authentication signal S_AUTH included in the second clock signal, and the second NFC chip 130 may need to generate the switching operation signal (SCS) to switch on the switch 110 based on the switching operation signal included in the second clock signal.

Figure 12:
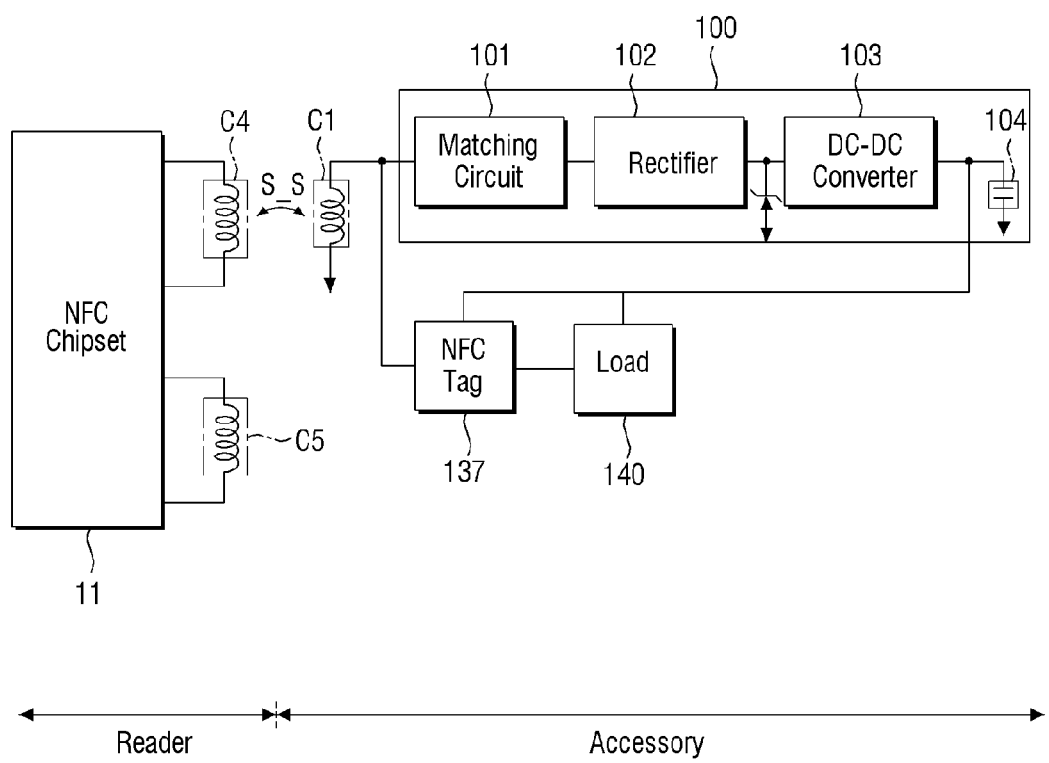
FIG. 12 is a block diagram of a semiconductor device according to an example embodiment.
Figure 13:
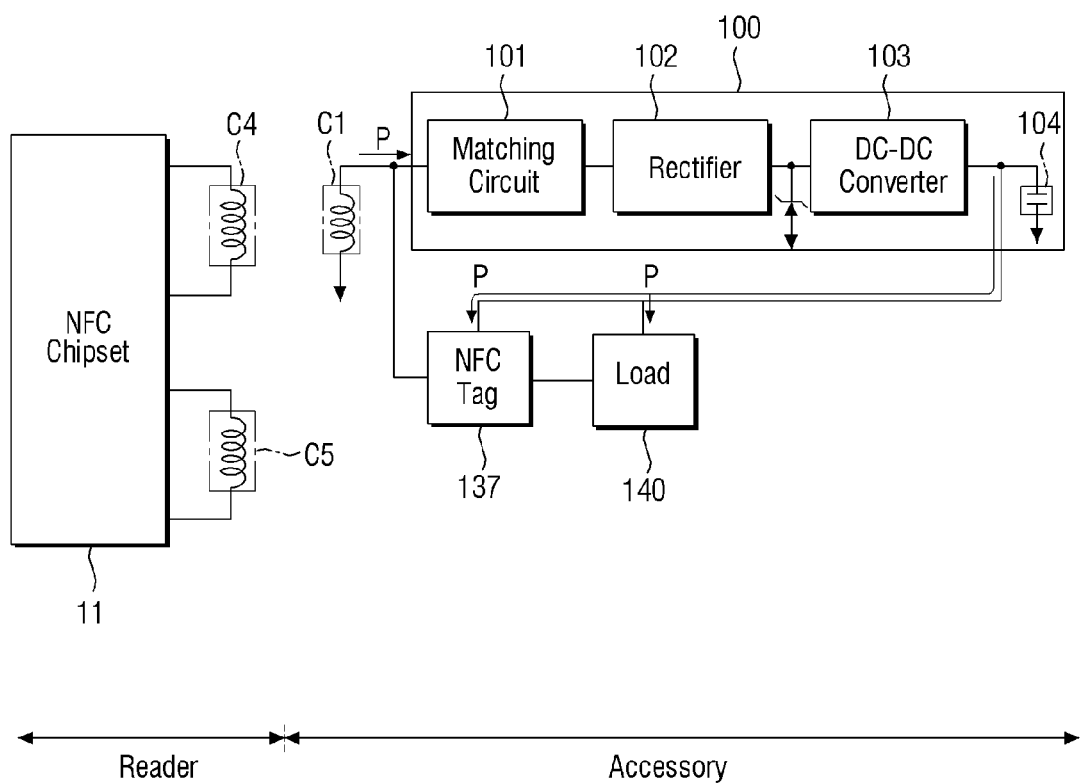
FIGS. 13 and 14 are block diagrams illustrating operations of the semiconductor device of FIG. 12.
Figure 14:
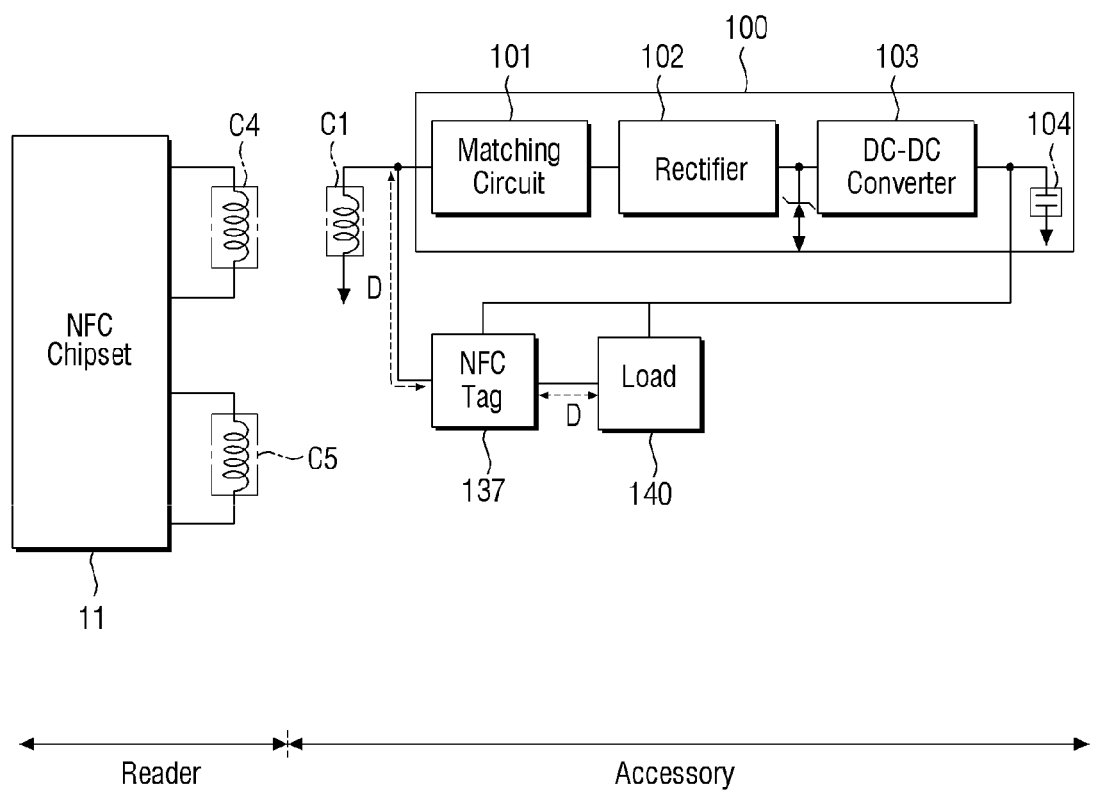

FIG. 12 is a block diagram illustrating a semiconductor device according to an example embodiment. FIGS. 13 and 14 are block diagrams illustrating operations of the semiconductor device of FIG. 12. Hereinafter, the description of the repeated parts of the above-described embodiment will be omitted, and differences will be mainly described.

As shown in FIG. 12, a semiconductor device 4 may include at least a reader and an accessory. The accessory portion of the semiconductor device 4 may include a first coil section C1, a power generator 100, an NFC chip 137 and a load chip 140.

The accessory portion of the semiconductor device 4 may operate in conjunction with the reader, and the reader may include an NFC chipset 11, a fourth coil section C4, and a fifth coil section C5 electrically connected to the NFC chipset 11. The reader may send a signal through the fourth coil section C4. The fifth coil section C5 may be used for other NFC communications different from the operations involving the accessory portion of the semiconductor device 4. That is, the fourth coil section C4 and the fifth coil section C5 may be physically separated from each other. The fourth coil section C4 and the first coil section C1 may be shielded by a magnetic field shielding material such as ferrite.

The first coil section C1 may receive a signal (i.e., a first clock signal) sent from the reader. Here, the first clock signal may include a voltage signal, an authentication signal, or data.

The power generator 100 may receive the first clock signal sent from the reader through the first coil section C1 to generate electric power P that is provided to the NFC chip 137 or the load chip 140. The NFC chip 137 and the load chip 140 may be electrically connected to the power generator 100. The load chip 140 may include an application, and the application may include various types of software, depending on the user's needs.

The power generator 100 may include a matching circuit 101, a rectifier 102, a converter 103, and a capacitor 104. The matching circuit 101 may perform impedance matching between a transmission end (i.e., the reader) and a reception end (i.e., the first coil section C1). The rectifier 102 may rectify an AC voltage received through the first coil section C1 to generate a DC voltage. The converter 103, for example, may be a DC-to-DC converter and may adjust a voltage level of the DC voltage output from the rectifier 102 to conform to the load capacity of the NFC chip 137 or the load chip 140. The capacitor 104 may store a reserve power that may be provided to the NFC chip 137 or the load chip 140.

As shown in FIG. 13, the NFC chip 137 may be electrically connected to the power generator 100 and receive the electric power from the power generator 100 in accordance with the first clock signal. When the first clock signal includes the voltage signal, the NFC chip 137 may receive the electric power from the power generator 100. Further, the electric power P generated by the power generator 100 may also be provided to the load chip 140.

FIG. 14 illustrates the data transmission and reception process of the semiconductor device 4.

The NFC chip 137 and the load chip 140 may be electrically connected to each other, and data may be transmitted and received between the NFC chip 137 and the load chip 140 through a wired communication channel. However, the present disclosure is not limited thereto, and the data may be wirelessly transmitted and received between the NFC chip 137 and the load chip 140, if necessary.

The data (i.e., the reception data or inbound data) sent from the reader may be transmitted to the NFC chip 137 through the first coil section C1, and the NFC chip 137 may transmit the reception data to the load chip 140. Also, the transmission data (i.e., outbound data) generated in the load chip 140 may be transmitted to the NFC chip 137, and the NFC chip 137 may output the transmission data to the reader as part of the data transmission and reception operations.

Further, the NFC chip 137 may perform an authentication operation. Specifically, when the first clock signal sent from the reader includes an authentication signal S_AUTH, the NFC chip 137 may receive the authentication signal S_AUTH through the first coil section C1, and the NFC chip 137 may perform authentication by determining whether the reader and/or the accessory is a genuine and/or authorized device. By selectively authorizing the power and data transfer only when the authentication process is successful through the NFC chip 137, it is possible to prevent the use of counterfeit or unauthorized devices.

Consequentially, the first clock signal may include a voltage signal, an authentication signal, or data. Further, in order that the voltage signal or data included in the first clock signal may be sent from the reader, the NFC chip 137 may need to perform the authentication operation in accordance with the authentication signal S_AUTH included in the first clock signal.

Figure 15:
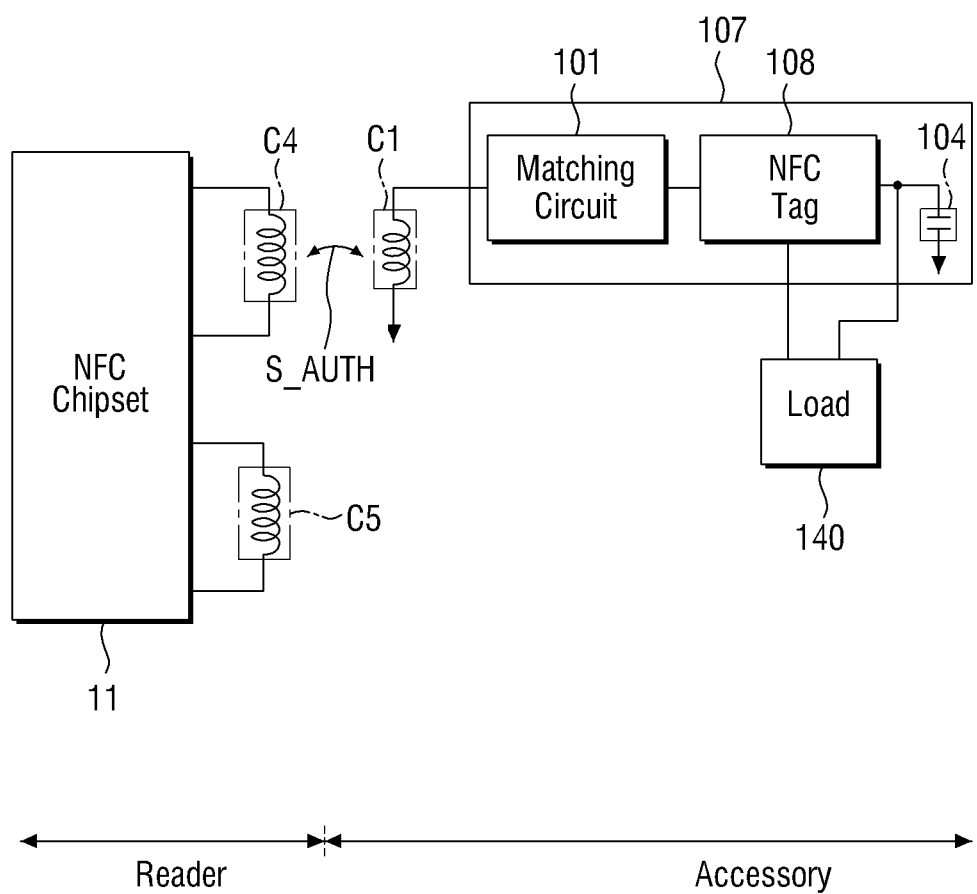
FIG. 15 is a block diagram of a semiconductor device according to an example embodiment.
Figure 16:
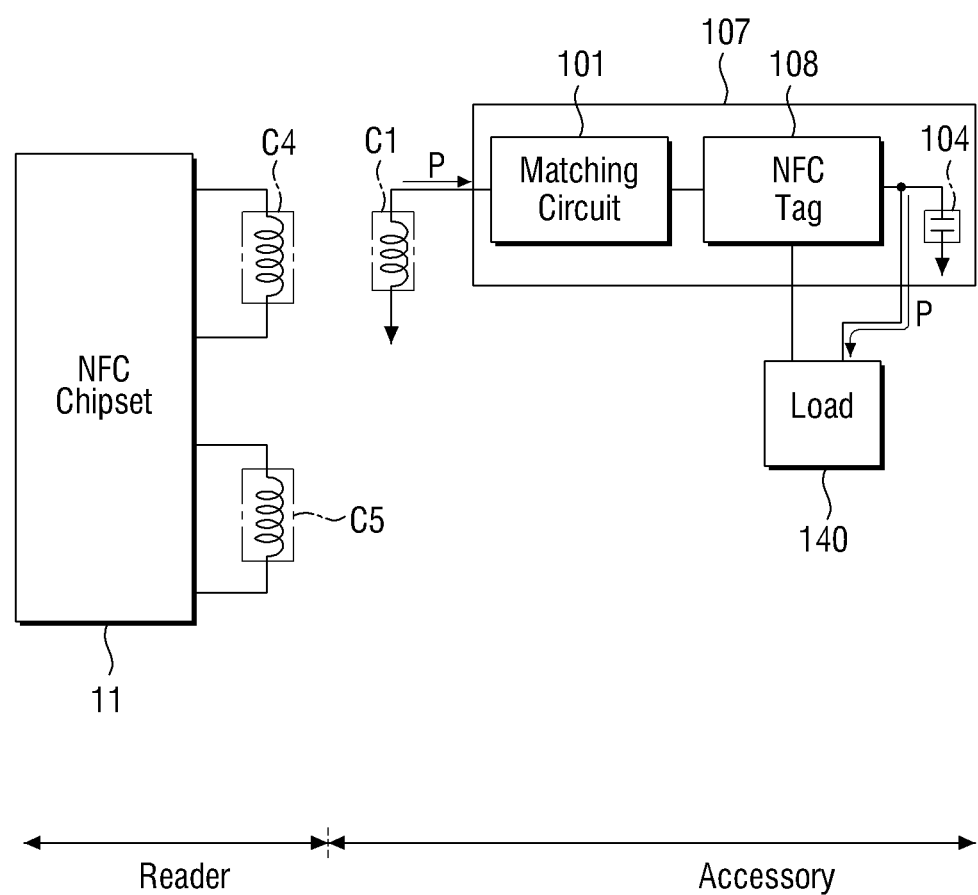
FIGS. 16 and 17 are block diagrams illustrating operations of the semiconductor device of FIG. 15.
Figure 17:
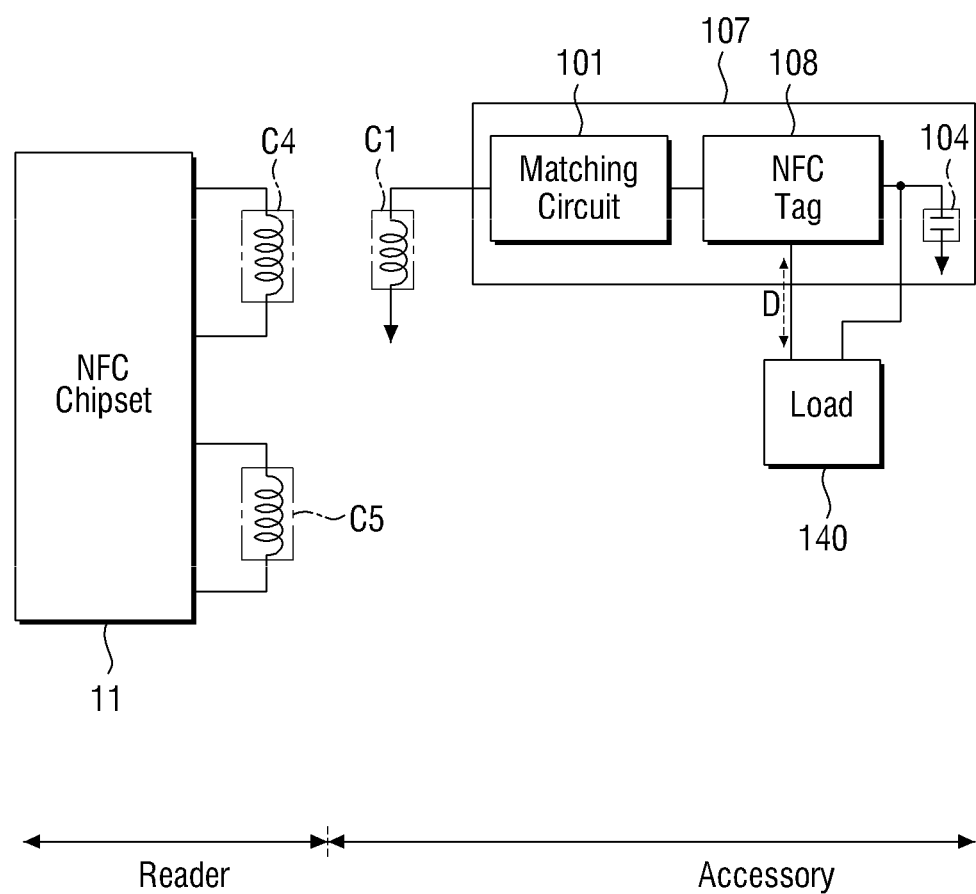

FIG. 15 is a block diagram of a semiconductor device according to an example embodiment. FIGS. 16 and 17 are block diagrams illustrating operations of the semiconductor device of FIG. 15. Hereinafter, the description of the repeated parts of the above-described embodiment will be omitted, and differences will be mainly described.

As shown in FIG. 15, a semiconductor device 5 may include at least a reader and an accessory. The accessory portion of the semiconductor device 5 may include a first coil section C1, a power generator 107, an NFC chip 108, and a load chip 140.

The accessory portion of the semiconductor device 5 may operate in conjunction with the reader, and the reader may include an NFC chipset 11, and the reader may include an NFC chipset 11, a fourth coil section C4 and a fifth coil section C5 electrically connected to the NFC chipset 11. The reader may send a signal through the fourth coil section C4. The fifth coil section C5 may be used for other NFC communications different from the operations involving the accessory portion of the semiconductor device 4. That is, the fourth coil section C4 and the fifth coil section C5 may be physically separated from each other. The fourth coil section C4 and the first coil section C1 may be shielded by a magnetic field shielding material such as ferrite.

The first coil section C1 may receive a signal (i.e., a first clock signal) sent from the reader. Here, the first clock signal may include a voltage signal, an authentication signal, or data.

The power generator 107 may receive the first clock signal sent from the reader through the first coil section C1 to generate electric power P to be provided to the load chip 140. The load chip 140 may be electrically connected to the power generator 107. The load chip 140 may include an application, and the application may include various types of software, depending on the user's needs.

The power generator 107 may include a matching circuit 101, an NFC chip 108, and a capacitor 104. The matching circuit 101 may perform impedance matching between a transmission end (i.e., the reader) and a reception end (i.e., the first coil section C1). The NFC chip 108 may receive the voltage signal from the matching circuit 101 to generate the electric power P and supply the power to the load chip 140. The capacitor 104 may store a reserve power that may be provided to the load chip 140.

As shown in FIG. 16, the load chip 140 may be electrically connected to the power generator 107 and receive the electric power from the power generator 107 in accordance with the first clock signal. When the first clock signal includes the voltage signal, the load chip 140 may receive the electric power from the power generator 107.

FIG. 17 illustrates the data transmission and reception process of the semiconductor device 5.

The NFC chip 108 and the load chip 140 may be electrically connected to each other, and data may be transmitted and received between the NFC chip 108 and the load chip 140 via a wired communication channel. However, the present disclosure is not limited thereto, and the data may be wirelessly exchanged between the NFC chip 108 and the load chip 140, if necessary.

The data (i.e., the reception data or inbound data) sent from the reader may be transmitted to the NFC chip 108 through the first coil section C1, and the NFC chip 108 may transmit the reception data to the load chip 140. Also, the transmission data (i.e., outbound data) generated from the load chip 140 may be transmitted to the NFC chip 108, and the NFC chip 108 may output the transmission data to the reader as part of the data transmission and reception operations.

Further, the NFC chip 108 may perform an authentication operation. Specifically, when the first clock signal sent from the reader includes an authentication signal S_AUTH, the NFC chip 108 may receive the authentication signal S_AUTH through the first coil section C1, and the NFC chip 108 may perform authentication by determining whether the reader and/or the accessory is a genuine and/or authorized device. By selectively authorizing the power and data transfer only when the authentication process is successful through the NFC chip 108, it is possible to prevent the use of counterfeit or unauthorized devices.

Consequentially, the first clock signal may include a voltage signal, an authentication signal, or data. Further, in order that the voltage signal or data included in the first clock signal may be sent from the reader, the NFC chip 108 may need to perform the authentication operation in accordance with the authentication signal S_AUTH included in the first clock signal.

Figure 18:
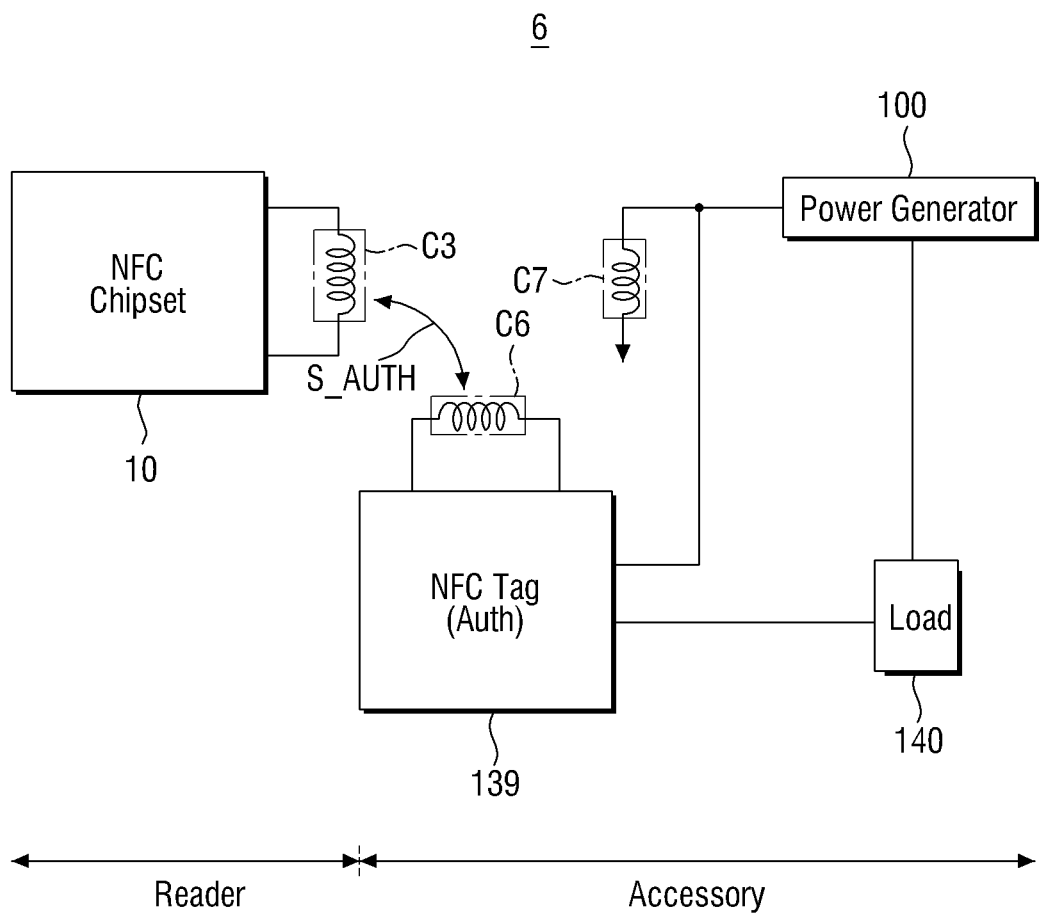
FIG. 18 is a block diagram illustrating a semiconductor device according to an example embodiment.

FIG. 18 is a block diagram of a semiconductor device according to an example embodiment. Hereinafter, the description of the repeated parts of the above-described embodiment will be omitted, and differences will be mainly described.

As shown in FIG. 18, a semiconductor device 6 may include at least a reader and an accessory. The accessory portion of the semiconductor device 6 may include a sixth coil section C6, a power generator 100, an NFC chip 139, a load chip 140, and a seventh coil section C7.

The accessory portion of the semiconductor device 6 may operate in conjunction with the reader, and the reader may include an NFC chipset 10 and a third coil section C3 electrically connected to the NFC chipset 10. The reader may send a signal through the third coil section C3.

The seventh coil section C7 may receive a signal (i.e., a first clock signal) sent from the reader. Here, the first clock signal may include a voltage signal.

The power generator 100 may be electrically connected to the seventh coil section C7. The power generator 100 may receive the first clock signal sent from the reader through the seventh coil section C7 to generate an electric power P to be provided to the load chip 140. The load chip 140 may be electrically connected to the power generator 100. The load chip 140 may include an application, and the application may include various types of software, depending on the user's needs.

The NFC chip 139 and the load chip 140 may be electrically connected to each other, and data may be transmitted and received between the NFC chip 139 and the load chip 140 via a wired communication channel. However, the disclosure is not limited thereto, and the data may be exchanged wirelessly between the NFC chip 139 and the load chip 140, if necessary.

The data (i.e., the reception data or inbound data) sent from reader may be transmitted to the NFC chip 139 through the sixth coil section C6, and the NFC chip 139 may transmit the reception data to the load chip 140. Also, the transmission data (i.e., outbound data) generated from the load chip 140 may be transmitted to the NFC chip 139, and the NFC chip 139 may output the transmission data to the reader as part of the data transmission and reception operations.

Further, the NFC chip 139 may perform an authentication operation. Specifically, when the second clock signal sent from the reader includes an authentication signal S_AUTH, the NFC chip 139 may receive the authentication signal S_AUTH through the sixth coil section C6, and the NFC chip 139 may perform authentication by determining whether the reader and/or the accessory is a genuine and/or authorized device. By selectively authorizing the power and data transfer only when the authentication process is successful through the NFC chip 139, it is possible to prevent the use of counterfeit or unauthorized devices.

Figure 19:
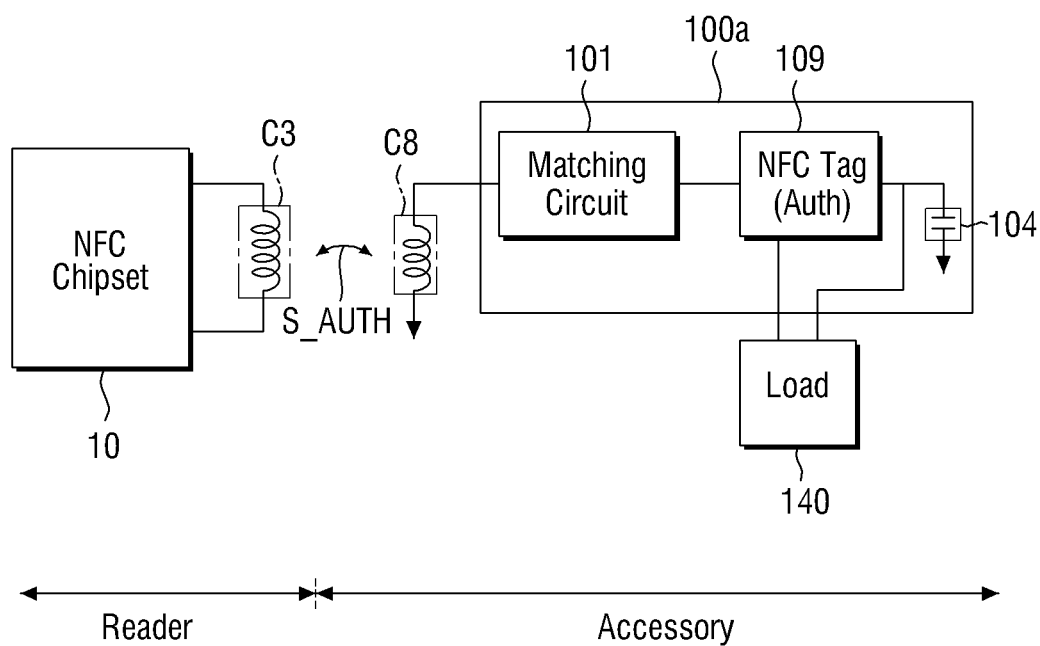
FIG. 19 is a block diagram illustrating a semiconductor device according to an example embodiment.

FIG. 19 is a block diagram of a semiconductor device according to an example embodiment. Hereinafter, the description of the repeated parts of the above-described embodiment will be omitted, and differences will be mainly described.

As shown in FIG. 19, a semiconductor device 7 may include at least a reader and an accessory. The accessory portion of the semiconductor device 7 may include an eighth coil section C8, a power generator 100*a*, an NFC chip 109, and a load chip 140.

The accessory portion of the semiconductor device 7 may operate in conjunction with the reader, and the reader may include an NFC chipset 10 and a third coil section C3 electrically connected to the NFC chipset 10. The reader may send a signal through the third coil section C3.

The eighth coil section C8 may receive a signal (i.e., a first clock signal) sent from the reader. Here, the first clock signal may include a voltage signal or an authentication signal S_AUTH.

The power generator 100*a* may be electrically connected to the eighth coil section C8. The power generator 100*a* may receive the first clock signal sent from the reader through the eighth coil section C8 to generate an electric power P to be provided to the load chip 140. Specifically, the electric power is generated from the NFC chip 109 included in the power generator 100*a*, and the generated electric power may be provided to the load chip 140. The load chip 140 may include an application, and the application may include various types of software, depending on the user's needs.

The NFC chip 109 and the load chip 140 may be electrically connected to each other, and data may be transmitted and received between the NFC chip 109 and the load chip 140 via a wired communication channel. However, the disclosure is not limited thereto, and the data may be exchanged wirelessly between the NFC chip 109 and the load chip 140, if necessary.

The data (i.e., the reception data or inbound data) sent from the reader may be transmitted to the NFC chip 109 through the eighth coil section C8, and the NFC chip 109 may transmit the reception data to the load chip 140. Also, the transmission data (i.e., outbound data) generated from the load chip 140 may be transmitted to the NFC chip 109, and the NFC chip 109 may output the transmission data to the reader as part of the data transmission and reception operations.

Further, the NFC chip 109 may perform an authentication operation. Specifically, when the first clock signal sent from the reader includes an authentication signal S_AUTH, the NFC chip 109 may receive the authentication signal S_AUTH through the eighth coil section C8, and the NFC chip 109 may perform authentication by determining whether the reader/and or the accessory is a genuine and/or authorized device. By selectively authorizing the power and data transfer only when the authentication process is successful through the NFC chip 109, it is possible to prevent the use of illegitimate or unauthorized devices.

Figure 20:
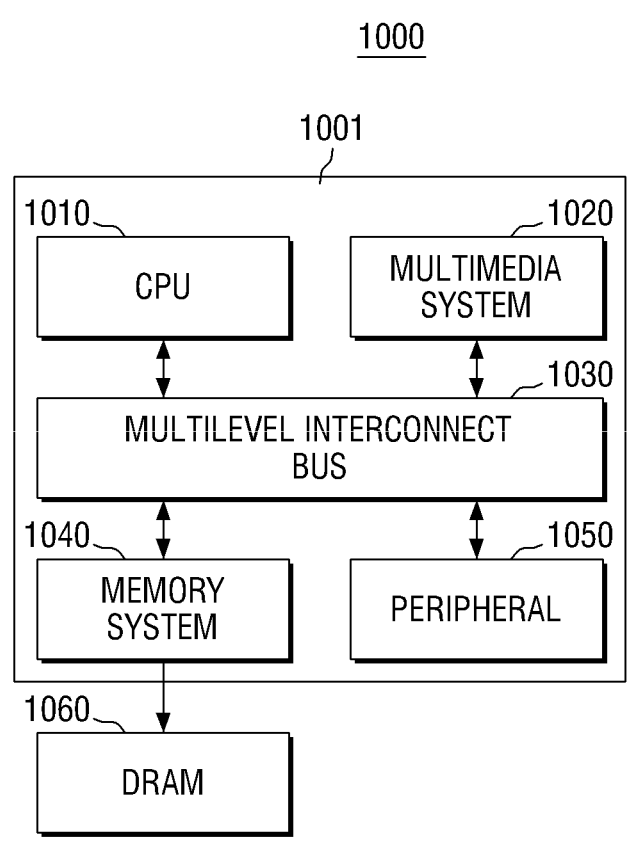
FIG. 20 is a block diagram of a system on chip (SoC) system including a semiconductor device according to an example embodiment.

FIG. 20 is a block diagram of an SoC system including a semiconductor device according to an example embodiment. The SoC system 1000 may include an application processor 1001 and a dynamic random access memory (DRAM) 1060.

The application processor 1001 may include a central processing unit 1010, a multimedia system 1020, a bus 1030, a memory system 1040, and a peripheral circuit 1050.

The central processing unit 1010 may perform the operations required for driving the SoC system 1000. In some embodiments, the central processing unit 1010 may be constituted by a multi-core environment that includes multiple cores.

The multimedia system 1020 may perform various multimedia functions in the SoC system 1000. The multimedia system 1020 may include a 3D engine module, a video codec, a display system, a camera system, a post-processor, and the like.

The bus 1030 may be used to perform data communications among the central processing unit 1010, the multimedia system 1020, the memory system 1040, and the peripheral circuit 1050. In some embodiments, the bus 1030 may have a multilayer structure. Specifically, as an example of the bus 1030, but not limited to, a multilayer advanced high-performance bus (AHB) or a multilayer advanced extensible interface (AXI) may be used.

The memory system 1040 may provide an environment needed for the application processor 1001 to connect to an external memory (e.g., the DRAM 1060) and operate at high speed. In some embodiments, the memory system 1040 may include a separate controller (e.g., a DRAM controller) needed to control the external memory (e.g., the DRAM 1060).

The peripheral circuit 1050 may provide an environment needed for the SoC system 1000 to smoothly connect to an external device (e.g., a main board). Accordingly, the peripheral circuit 1050 may include various interfaces that enable the external device connected to the SoC system 1000 to be compatible with the SoC system 1000.

The DRAM 1060 may function as an operating memory (i.e., primary storage or main memory) needed for the operation of the application processor 1001. In some embodiments, the DRAM 1060 may be disposed outside the application processor 1001 as illustrated. Alternatively, the DRAM 1060 may be packaged with the application processor 1001 in the form of package on package (PoP).

At least one of the semiconductor devices according to the above-described example embodiments may be included in the SoC system 1000.

Figure 21:
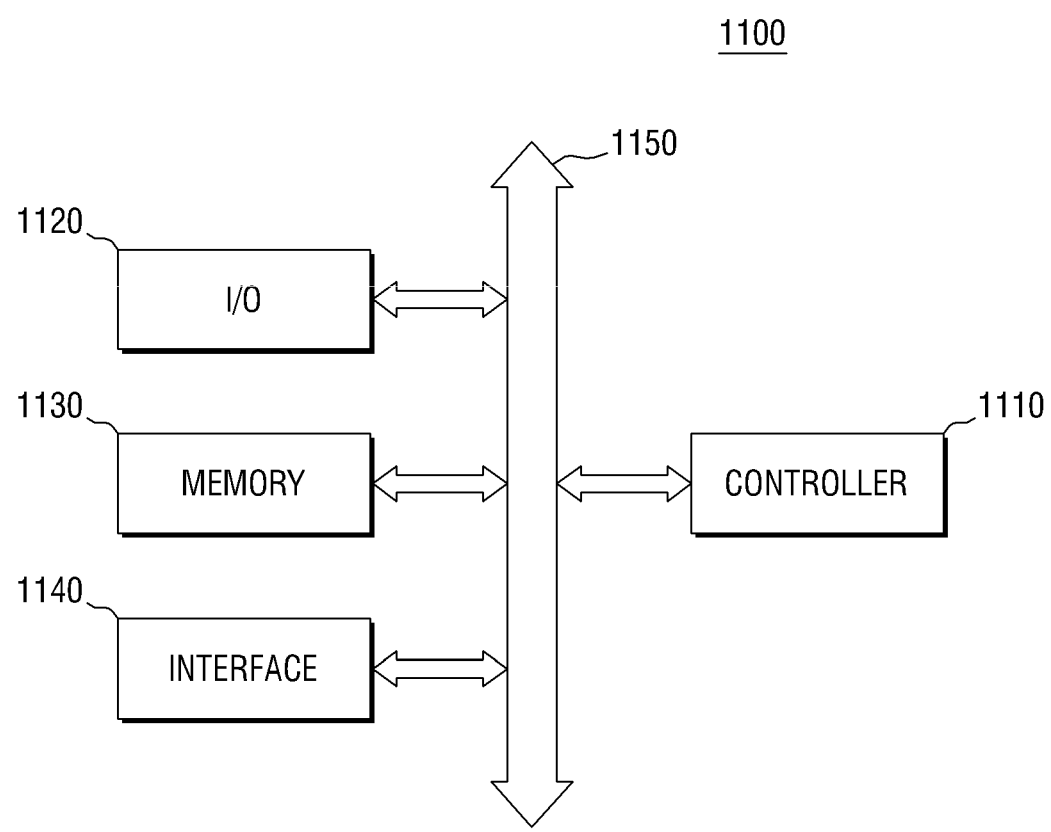
FIG. 21 is a block diagram of an electronic system including a semiconductor device according to an example embodiment.

FIG. 21 is a block diagram of an electronic system including a semiconductor device according to an example embodiment.

As shown in FIG. 21, an electronic system 1100 according to an exemplary embodiment may include a controller 1110, an input/output (I/O) device 1120, a memory device 1130, an interface 1140, and a bus 1150. The controller 1110, the I/O device 1120, the memory device 1130, and/or the interface 1140 may be connected to one another through the bus 1150. The bus 1150 may correspond to a path through which the data are moved.

The controller 1110 may include at least one of a microprocessor, a digital signal processor, a microcontroller, and a logic device capable of performing functions similar to these devices.

The I/O device 1120 may include a keypad, a keyboard, a display device, and the like. The memory device 1130 may store data and/or commands.

The interface 1140 may transmit data to or receive data from a communication network. The interface 1140 may be a wired or wireless interface. For example, the interface 1140 may include an antenna or a wired or wireless transceiver.

The electronic system 1100 may also include a high-speed DRAM or static random access memory (SRAM), as an operating memory for improving the operation of the controller 1110.

At least one of the semiconductor devices according to the example embodiments described above may be included as a constituent element in the electronic system 1100.

The electronic system 1100 may be applied to a personal digital assistant (PDA), a portable computer, a tablet computer, a wireless phone, a mobile phone, a digital music player, a memory card, or any type of electronic device capable of transmitting or receiving information in a wireless environment.

Figure 22:
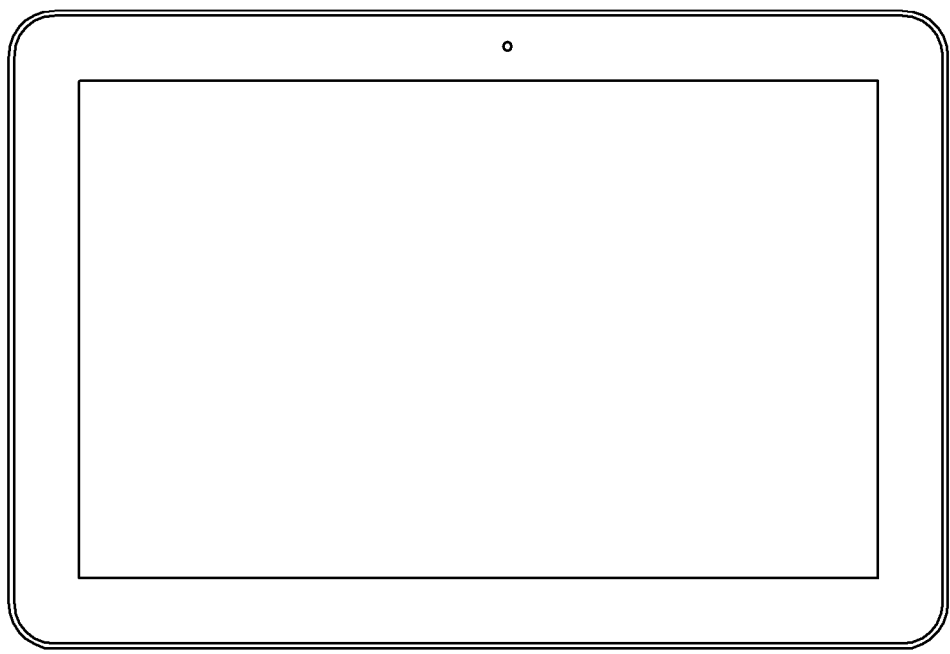
FIGS. 22, 23 and 24 are diagrams illustrating exemplary semiconductor systems to which a semiconductor device according to some example embodiments is applicable.
Figure 23:
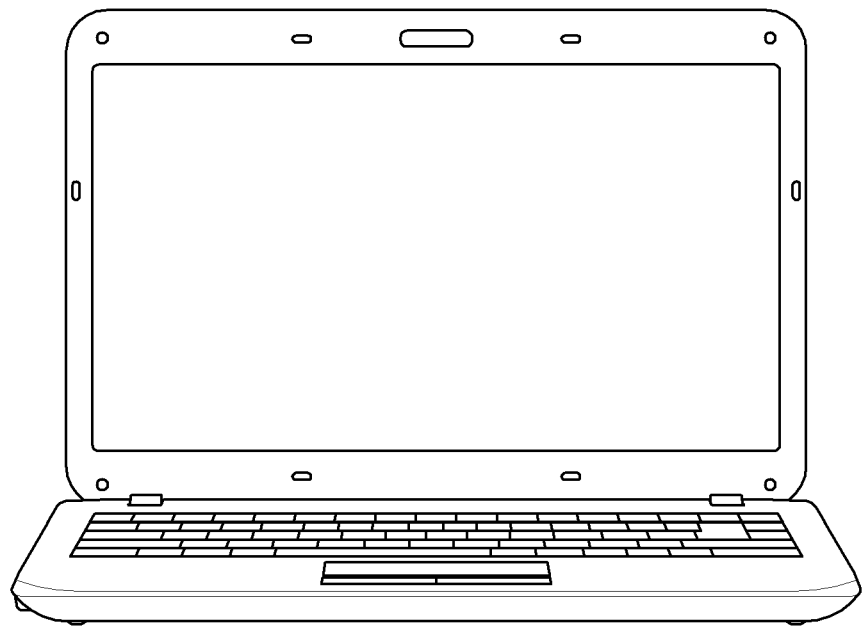
Figure 24:
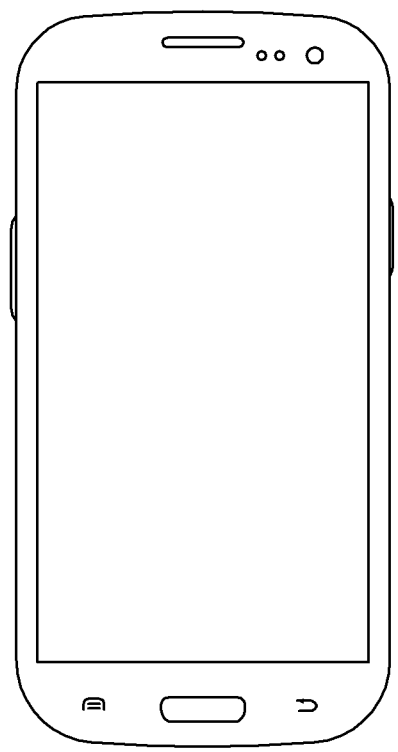

FIGS. 22, 23 and 24 are diagrams illustrating examples of a semiconductor system to which a semiconductor device according to some example embodiments can be applied.

FIG. 22 illustrates a tablet personal computer (PC) 1200, FIG. 23 illustrates a notebook computer 1300, and FIG. 24 illustrates a smart phone 1400. A semiconductor device according to one of the embodiments described above may be used in the tablet PC 1200, the notebook computer 1300, the smart phone 1400, and the like.

Further, it will be understood by a person skilled in the art that the exemplary semiconductor devices according to the embodiments of this disclosure may also be applied to other IC devices other than those set forth herein.

That is, while only the tablet PC 120, the notebook computer 1300, and the smart phone 1400 have been described above as examples of the semiconductor system according to this embodiment, the examples of the semiconductor system according to the embodiment are not limited thereto.

In some embodiments, the semiconductor system may be provided as a computer, an Ultra Mobile PC (UMPC), a workstation, a netbook computer, a personal digital assistant (PDA), a portable computer, a wireless phone, a mobile phone, an e-book reader, a portable multimedia player (PMP), a portable video game console, a navigation device, a black box, a vehicle dashboard camera, a digital camera, a 3-dimensional television set, a digital audio recorder, a digital audio player, a digital picture recorder, a digital picture player, a digital video recorder, a digital video player, etc.

While example embodiments have been particularly illustrated and described, it will be understood by those of ordinary skill in the art that various changes in form and detail may be made therein without departing from the spirit and scope of the present inventive concept as defined by the following claims. The example embodiments should be considered in a descriptive sense only and not for purposes of limitation.

What is claimed is:

1. A semiconductor device comprising:
a first coil section configured to receive a first clock signal from a reader;
a power generator that is electrically connected to the first coil section in accordance with a switching operation of a switch;
a first near-field communication (NFC) chip that is electrically connected to the power generator and configured to receive electric power in accordance with the first clock signal;
a second NFC chip configured to generate a switching operation control signal for controlling the switching operation of the switch; and
a second coil section that is electrically connected to the second NFC chip and configured to receive a second clock signal from the reader.

2. The semiconductor device of claim 1, wherein the second NFC chip is configured to, when the second clock signal includes a switching operation signal of the switch, generate the switching operation control signal.

3. The semiconductor device of claim 2, wherein the switch is configured to, when the switching operation signal is a switch-on signal, switch on in accordance with the switching operation control signal to electrically connect the first coil section and the power generator.

4. The semiconductor device of claim 1, wherein the second clock signal comprises an authentication signal, and the second NFC chip is configured to perform authentication in accordance with the second clock signal.

5. The semiconductor device of claim 1, further comprising a load chip that is electrically connected to the power generator and includes application software.

6. The semiconductor device of claim 5, wherein the first NFC chip and the load chip are configured to receive the electric power from the power generator, when the first clock signal includes a voltage signal.

7. The semiconductor device of claim 5, wherein the first NFC chip and the load chip are electrically connected to each other and configured to transmit and receive data between the first NFC chip and the load tip.

8. The semiconductor device of claim 7, wherein the first NFC chip is further configured to receive the data from the load chip and output the data to the reader through the first coil section.

9. The semiconductor device of claim 7, wherein the first NFC chip is configured to receive the data from the reader through the first coil section and transmit the data to the load chip.

10. A semiconductor device comprising:
a first coil section configured to receive a first clock signal from a reader;
a power generator that is electrically connected to the first coil section in accordance with a switching operation of a switch;

a load chip that is electrically connected to the power generator and configured to receive electric power in accordance with the first clock signal, wherein the load chip comprises application software;

a near-field communication (NFC) chip configured to generate a switching operation control signal for controlling the switching operation of the switch, and is electrically connected to the load chip to transmit and receive data; and a second coil section that is electrically connected to a second NFC chip and configured to receive a second clock signal from the reader.

11. The semiconductor device of claim 10, wherein the NFC chip is configured to, when the second clock signal includes a switching operation signal of the switch, generate the switching operation control signal.

12. The semiconductor device of claim 11, wherein the switch is configured to, when the switching operation signal is a switch-on signal, switch on in accordance with the switching operation control signal to electrically connect the first coil section and the power generator.

13. The semiconductor device of claim 10, wherein the second clock signal comprises an authentication signal and is configured to perform authentication in accordance with the second clock signal.

14. The semiconductor device of claim 10, wherein the load chip is configured to receive the electric power from the power generator, when the first clock signal includes a voltage signal.

15. The semiconductor device of claim 10, wherein the NFC chip is configured to receive the data from the load chip and output the data to the reader through the second coil section.

16. The semiconductor device of claim 10, wherein the NFC chip is configured to receive the data from the reader through the second coil section and transmit the data to the load chip.

17. A semiconductor device comprising:

a first coil section configured to receive a first clock signal from a reader;

a power generator comprising a matching circuit electrically connected to the first coil section in accordance with a switching operation of a switch to perform impedance matching, and a first near-field communication (NFC) chip configured to receive a voltage signal from the matching circuit to generate electric power;

a load chip that is electrically connected to the first NFC chip and configured to receive the electric power in accordance with the first clock signal, wherein the load chip comprises application software;

a second NFC chip configured to generate a switching operation control signal for controlling the switching operation of the switch; and a second coil section that is electrically connected to the second NFC chip and configured to receive a second clock signal from the reader.

18. The semiconductor device of claim 17, wherein the second NFC chip is further configured to, when the second clock signal includes a switching operation signal of the switch, generate the switching operation control signal.

19. The semiconductor device of claim 18, wherein the switch is configured to, when the switching operation signal is a switch-on signal, switch on in accordance with the switching operation control signal to electrically connect the first coil section and the power generator.

20. The semiconductor device of claim 17, wherein the second clock signal comprises an authentication signal, and the second NFC chip is further configured to perform authentication in accordance with the second clock signal.

* * * * *